US010762498B2

(12) United States Patent
Xu et al.

(10) Patent No.: US 10,762,498 B2
(45) Date of Patent: Sep. 1, 2020

(54) METHOD AND SYSTEM FOR SECURE TRANSACTIONS ON A SOCIAL NETWORK PLATFORM

(71) Applicant: Tencent Technology (Shenzhen) Company Limited, Shenzhen (CN)

(72) Inventors: Jiajie Xu, Shenzhen (CN); Zhonghua Lai, Shenzhen (CN); Runda Cai, Shenzhen (CN); Wei Mao, Shenzhen (CN); Qiang Lu, Shenzhen (CN); Zhenyu Xu, Shenzhen (CN); Wa Ye, Shenzhen (CN); Deyuan Li, Shenzhen (CN); Dacheng Zhuo, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 1056 days.

(21) Appl. No.: 15/160,978

(22) Filed: May 20, 2016

(65) Prior Publication Data

US 2016/0267475 A1   Sep. 15, 2016

Related U.S. Application Data

(63) Continuation of application No. PCT/CN2015/070471, filed on Jan. 9, 2015.

(30) Foreign Application Priority Data

Jan. 10, 2014   (CN) .......................... 2014 1 0012443

(51) Int. Cl.
*G06Q 20/38* (2012.01)
*H04L 29/06* (2006.01)
(Continued)

(52) U.S. Cl.
CPC ........... *G06Q 20/382* (2013.01); *G06Q 20/12* (2013.01); *G06Q 20/40* (2013.01);
(Continued)

(58) Field of Classification Search
CPC ...... G06Q 20/382; G06Q 20/12; G06Q 20/40; H04L 63/0428; H04L 63/08; H04L 63/126
See application file for complete search history.

(56) References Cited

U.S. PATENT DOCUMENTS

| 2001/0014878 A1* | 8/2001 | Mitra | ................. G06Q 30/0601 |
| | | | 705/39 |
| 2003/0018525 A1* | 1/2003 | Joao | ................... G06Q 30/0203 |
| | | | 705/14.19 |

(Continued)

FOREIGN PATENT DOCUMENTS

| CN | 1465026 A | 12/2003 |
| CN | 101490703 A | 7/2009 |

(Continued)

OTHER PUBLICATIONS

Tencent Technology, ISRWO, PCT/CN2015/070471, Apr. 21, 2015, 7 pgs.

(Continued)

*Primary Examiner* — Steven S Kim
*Assistant Examiner* — Timothy Paul Sax
(74) *Attorney, Agent, or Firm* — Morgan, Lewis & Bockius LLP

(57) ABSTRACT

This application discloses a method for implementing a secure transaction via a social network platform. A server receives a product purchase request from a client device, and the product purchase request includes product information, product server information and a user account identifier of the social network platform. The transaction server authen-
(Continued)

ticates the product purchase request, and forwards the product purchase request of the corresponding product to the product server in an encrypted format. After receiving a confirmation message from the product server, the transaction server initiates a payment transaction between the user account and the product server. Further, after completing the payment transaction, the transaction server sends a payment completion message to the client device and the product server, respectively.

15 Claims, 13 Drawing Sheets

(51) Int. Cl.
    *G06Q 20/12*     (2012.01)
    *G06Q 20/40*     (2012.01)
    *H04W 12/00*     (2009.01)
    *G06Q 50/00*     (2012.01)

(52) U.S. Cl.
    CPC .......... *H04L 63/0428* (2013.01); *H04L 63/08* (2013.01); *H04L 63/126* (2013.01); *G06Q 50/01* (2013.01); *H04W 12/00522* (2019.01)

(56) References Cited

U.S. PATENT DOCUMENTS

| | | | |
|---|---|---|---|
| 2004/0044739 A1* | 3/2004 | Ziegler | G06Q 20/4014 709/213 |
| 2009/0119505 A1* | 5/2009 | Ward | G06Q 20/02 713/156 |
| 2010/0250397 A1* | 9/2010 | Ippolito | G06Q 30/0601 705/26.1 |
| 2011/0099376 A1 | 4/2011 | Gupta et al. | |
| 2012/0209749 A1* | 8/2012 | Hammad | G06Q 20/20 705/27.1 |
| 2013/0080280 A1* | 3/2013 | Scipioni | G06Q 30/0601 705/26.1 |
| 2013/0212004 A1* | 8/2013 | Itwaru | G06Q 20/102 705/39 |
| 2014/0279418 A1* | 9/2014 | Rubinstein | G06Q 10/10 705/39 |

FOREIGN PATENT DOCUMENTS

| | | |
|---|---|---|
| CN | 101918965 A | 12/2010 |
| CN | 102792630 A | 11/2012 |
| CN | 103218717 A | 7/2013 |
| CN | 103491533 A | 1/2014 |
| WO | WO 2012/112822 A2 | 8/2012 |

OTHER PUBLICATIONS

Tencent Technology, IPRP, PCT/CN2015/070471, Jul. 12, 2016, 4 pgs.

\* cited by examiner

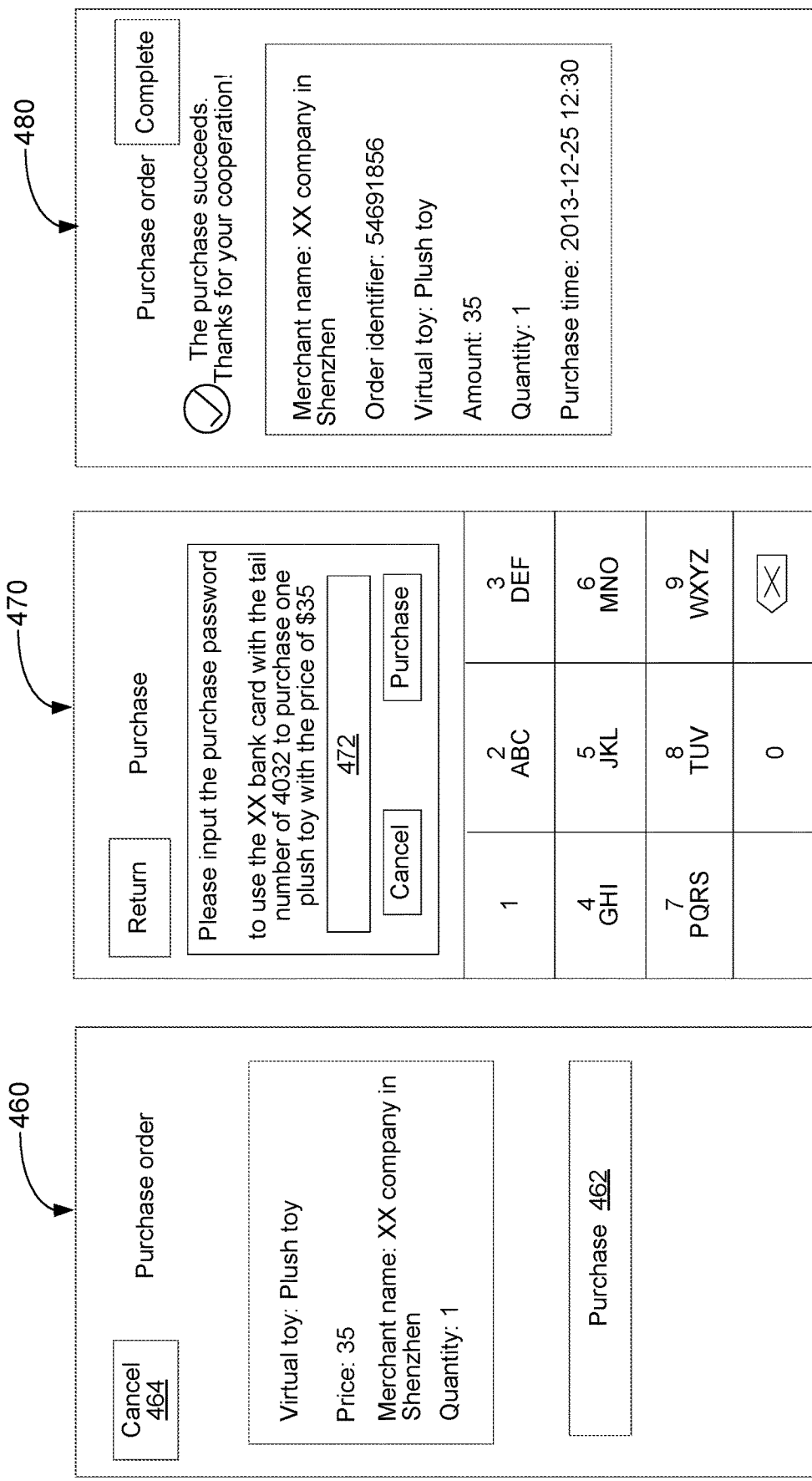

At a server having one or more processors and memory storing programs for execution by the processors:

1200

Receiving a product purchase request from a mobile device, the product purchase request including product information and merchant server information and a user account identifier of the social network platform 1202

Authenticating the product purchase request 1204

Forwarding the product purchase request of the corresponding product to the merchant server in an encrypted format 1206

After receiving a confirmation message from the merchant server, initiating a payment transaction between the user account and the merchant server 1208

After completing the payment transaction, sending a payment completion message to the mobile device and the merchant server, respectively 1210

FIG. 12

METHOD AND SYSTEM FOR SECURE TRANSACTIONS ON A SOCIAL NETWORK PLATFORM

RELATED APPLICATIONS

This application is a continuation application of PCT Patent Application No. PCT/CN2015/070471, entitled "METHOD AND SYSTEM FOR SECURE TRANSACTIONS ON A SOCIAL NETWORK PLATFORM" filed on Jan. 9, 2015, which claims priority to Chinese Patent Application No. 201410012443.2, entitled "TRANSACTION PROCESSING METHOD, APPARATUS, SERVER, CLIENT DEVICE, AND SYSTEM" filed on Jan. 10, 2014, both of which are incorporated by reference in their entirety.

TECHNICAL FIELD

The application relates to the field of computer technology, and in particular, to systems and methods for implementing a secure transaction via a social network platform.

BACKGROUND

Network technology has developed and widely applied to facilitate secure transactions among different users. A merchant publishes product information on a product platform that is enabled by a product server managed by the merchant. When a customer implements a user action to purchase a product displayed on the product platform, a payment is arranged from a first financial account owned by the customer to a second financial account owned by the merchant in exchange for the purchased product.

Specifically, during the course of implementing a secure transaction, a client device associated with the customer displays information concerning at least one product provided by a product server of a merchant. After detecting a user action (e.g., a user selection) on a product, the client device sends a transaction server (most probably via the product server of the merchant) a product purchase request to purchase the product. The transaction server receives the product purchase request according to which the transaction server obtains detailed product information (e.g., options of colors or sizes), and provides the detailed product information concerning the selected product to the client device. The client device displays the detailed product information concerning the selected product, and receives a user input (e.g., a transaction confirmation, user selection of product options) based on the displayed detailed product information concerning the selected product. Upon receiving the user input about the purchased product, the transaction server modifies the product purchase request according to the user input, and sends the modified product purchase request to the client device again. The client device confirms the modified product purchase request, and then provides financial account information of the customer to the transaction server probably via the merchant's product server. Then, the transaction server transfers a monetary resource from the first financial account owned by the customer to a second financial account owned by the merchant. After the financial transfer is successfully completed, the transaction server authorizes the merchant to transfer the product to the client device.

For example, the product is a "camera", the detailed product information displayed on the client device includes a "camera color", a "camera price", a "camera quantity", and the like. If the customer confirms the purchase of the camera, the client device sends the user input of "red" color, the quantity of "1" and the customer account information to the transaction server. The server modifies the product purchase request according to the user input and sends the modified product purchase request to the client device. The client device displays the modified product purchase request and waits for the customer's confirmation of the purchase request. Only when it receives the customer's confirmation, the transaction server authorizes the financial payment from the customer's account to the merchant's account, and the product from the merchant to the customer.

However, the above method of processing the purchase request is inherently plagued with some security issues. Specifically, the transaction server processes the financial account information (e.g., account name and account password) of both the customer and the merchant to determine whether the customer could properly pay for the purchase request and whether the merchant could transfer the purchased product to the customer. This transaction server could be owned by the merchant or have to work with the product server of the merchant. In some situations, a hacker disguises a malicious server as a product server to provide product information for the purpose of attracting potential hacking targets. The malicious server would fish for sensitive information during the purchase transaction and compromise the security of the client devices and the financial accounts associated with the customers.

SUMMARY

The above deficiencies and other problems associated with the conventional approaches for enabling secure transactions are reduced or eliminated by the application disclosed below. In some embodiments, the application is implemented in a server system that has one or more processors, memory and one or more modules, programs or sets of instructions stored in the memory for performing multiple functions. Instructions for performing these functions may be included in a computer program product configured for execution by one or more processors.

One aspect of the application is a method for implementing a secure transaction via a social network platform. The method is implemented at a server, and includes receiving a product purchase request from a client device. The product purchase request includes product information, product server information and a user account identifier of the social network platform. The method further includes authenticating the product purchase request, forwarding the product purchase request of the corresponding product to the product server in an encrypted format, after receiving a confirmation message from the product server, initiating a payment transaction between the user account and the product server, and after completing the payment transaction, sending a payment completion message to the client device and the product server, respectively.

Another aspect of the application is a server system that includes one or more processors, and memory having instructions stored thereon, which when executed by the one or more processors cause the processors to perform operations to implement the above method for implementing a secure transaction via a social network platform.

Another aspect of the application is a non-transitory computer-readable medium, having instructions stored thereon, which when executed by one or more processors cause the processors to perform operations to implement the above methods for implementing a secure transaction via a social network platform.

Various advantages of the application would be apparent in light of the descriptions below.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

To illustrate the technical solutions according to the embodiments of the application more clearly, the accompanying drawings for describing the embodiments are introduced briefly in the following. Apparently, the accompanying drawings in the following description are merely some embodiments of the application, and persons of ordinary skill in the art can derive other drawings from the accompanying drawings without creative efforts.

FIG. 4D is an exemplary GUI of a virtual toy purchase instruction display interface in accordance with some embodiments.

FIG. 4E is an exemplary GUI for entering a password for placing a purchase order for a virtual toy in accordance with some embodiments.

FIG. 4F is an exemplary GUI for indicating that a virtual toy purchase is successfully completed in accordance with some embodiments.

FIG. 12 is a flow chart of another exemplary method for implementing a secure transaction (e.g., a purchase order) in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

To make the objectives, technical solutions, and advantages of the application more comprehensible, the following further describes the embodiments of the application in detail with reference to the accompanying drawings.

In accordance with various embodiments of this application, FIGS. 1-3, 4A, 4C and 12 are flow charts of three exemplary methods 100, 200, 300, 400, 440 and 1200 for implementing a secure transaction (e.g., a purchase order) in accordance with some embodiments, respectively. Each of methods 100, 200, 300, 400, 440 and 1200 is, optionally, governed by instructions that are stored in a non-transitory computer readable storage medium and that are executed by one or more processors of one or more computer machines (e.g., a transaction server, a client device and a product server). Each of the operations shown in FIGS. 1-3, 4A, 4C and 12 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in methods 100, 200, 300, 400, 440 and 1200 may be combined and/or the order of some operations may be changed.

It should be understood that the particular order in which the operations in each of FIGS. 1-3, 4A, 4C and 12 have been described are merely exemplary and are not intended to indicate that the described order is the only order in which the operations could be performed. One of ordinary skill in the art would recognize various ways to control information shared on an open platform as described herein. Additionally, it should be noted that details of other processes described herein with respect to one of methods 100, 200, 300, 400, 440 and 1200 are also applicable in an analogous manner to any other method of methods 100, 200, 300, 400, 440 and 1200.

Figure 1:
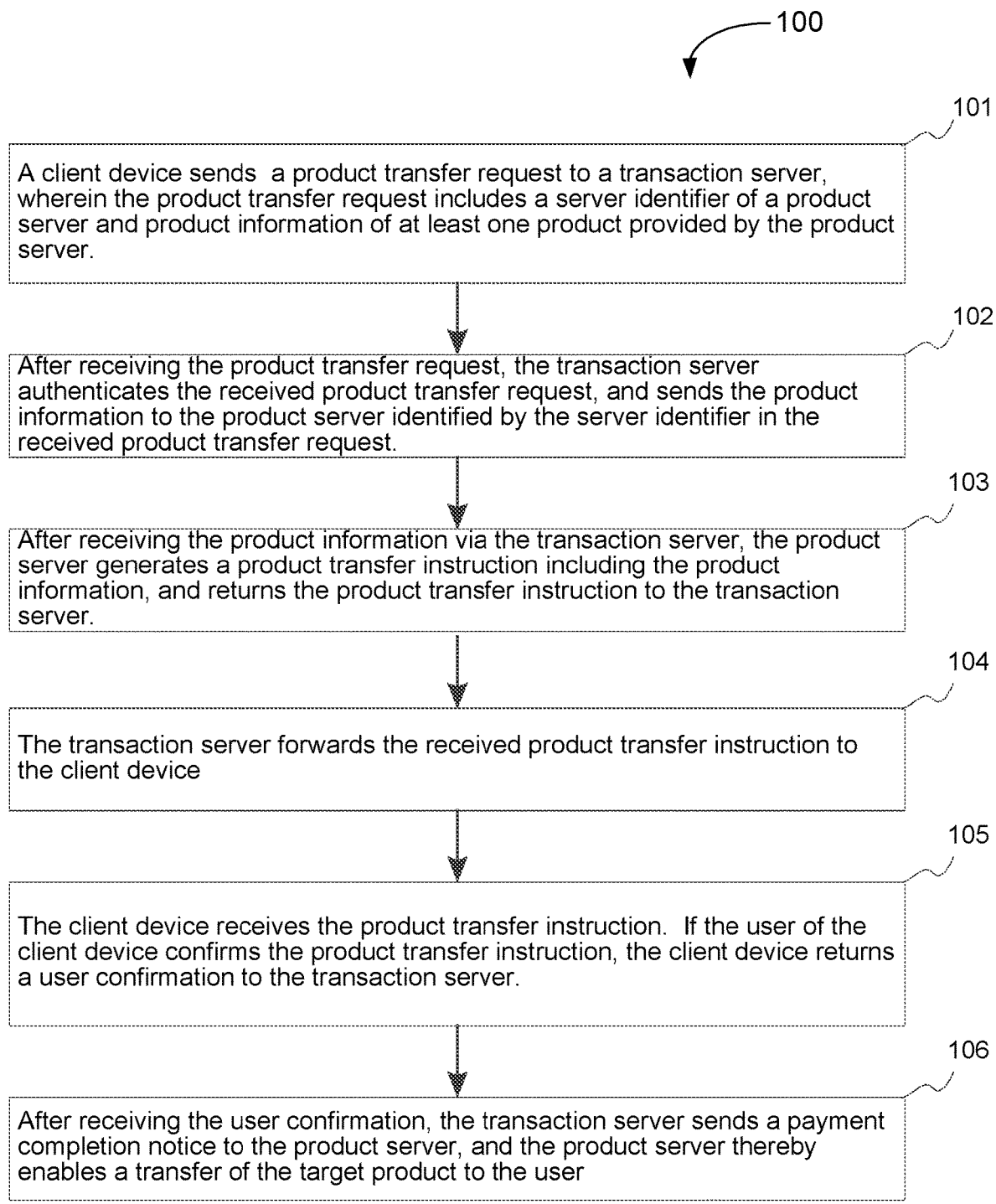
FIGS. 1-3 are flow charts of three exemplary methods for implementing a secure transaction (e.g., a purchase order) in accordance with some embodiments.

Refer to FIG. 1, which shows a flow chart of an exemplary method for implementing a secure transaction according to an embodiment of the application. Transaction processing method 100 is implemented to a secure transaction system at least including a transaction server and a client device. In accordance with transaction processing method, the transaction server is an intermediate server between the client device controlled by a user who requested the secure transaction and another product server controlled by a merchant who provides one or more products in the secure transaction.

A client device sends (101) a product transfer request to a transaction server. The product transfer request includes a server identifier of a product server and product information of at least one product provided by the product server. In some embodiments, a merchant that controls the product server could provide a physical product (e.g., a toy and a book) in real life according to the product transfer request. Alternatively, in some embodiments, the product includes data or programs (e.g., Stickers or Emotions in an instant messaging application, virtual equipment in a game application, and an online member service), and the merchant provides the data and program product to the client device directly from the product server.

The product server publishes information to promote the product independently of whether the product is a physical product or a virtual product. When a user reviews the published product information provided by the product server, he places a purchase order with one or more associated products. To make the purchase order, the client device obtains from the product server the server identifier of the product server and the product information of the product he is interested in, and generates the product transfer request to include these two information items. The client device then sends the product transfer request to the transaction server to request to purchase the interested product. In some embodiments, the product information provided by the product server includes a product identifier, a product name, a quantity, description and a price of each target product.

Therefore, the product transfer request includes the server identifier of the product server and the product information of the target products. When the transaction server receives the product transfer request, it properly associates each target product with the respective product server, and thereby commands the respective product server to provide the target product when the purchase order has been verified. In some embodiments, the product information provided by the product server includes a product identifier, a product name, a quantity, and a price of each target product.

After receiving the product transfer request, the transaction server authenticates (102) the received product transfer request, and sends the product information to the product server identified by the server identifier in the received product transfer request. Here, the transaction server authenticates the product transfer request to determine whether the product server is secure. Such an authentication operation avoids a product server that is a malicious server, and protects private information associated with a user or a user account from being leaked during the course of interacting with the product server.

If the transaction server authenticates the product transfer request successfully, it is determined that the product server is secure, and the product information of the product is then sent to the product server. Alternatively, if the transaction server could not authenticate the product transfer request, (i.e., if the authentication fails), it is determined that the product server is insecure, and the transaction server terminates the secure transaction (i.e., the purchase order).

After receiving the product information via the transaction server, the product server generates (103) a product transfer instruction including the product information, and returns the product transfer instruction to the transaction server. In some implementations, the product server searches for the target product in a product database according to the product identifier included in the product information. The product server determines whether the product database includes the product identifier and whether the corresponding target product is available in the merchant's product stock. If the product identifier is found in the product database, the product server determines that the corresponding target product is available, and thereby generates a product transfer instruction including the product information. The product server then sends the product transfer instruction to the transaction server.

The transaction server forwards (104) the received product transfer instruction to the client device.

The client device receives (105) the product transfer instruction. If the user of the client device confirms the product transfer instruction, the client device returns a user confirmation to the transaction server. Specifically, upon receiving the product transfer instruction from the product server via the transaction server, the client device displays the product information in the product transfer instruction. The user verifies that the product information is consistent with the target product that he intends to purchase optionally by a user action (e.g., a click on a confirmation button displayed on the client device). Once the product information is confirmed, the client device generates the user confirmation and sends the user confirmation to the transaction server. In some embodiments, the user confirmation includes the product information and information of a first financial account, and the first financial account is associated with a user account onto which the user has logged on the client device.

After receiving the user confirmation, the transaction server sends (106) a payment completion notice to the product server, and the product server thereby enables a transfer of the target product to the user.

The transaction server obtains the information of the first financial account and a cost of the target product from the user confirmation. The transaction server also obtains information of a second financial account associated with the product server and the merchant. Then, the transaction server transfers a fund that is equal to the cost of the target product from the first financial account to the second financial account, and sends a payment completion notice to the product server. Upon receiving the payment completion notice, the product server transfers the product to the client device according to the payment completion notice.

In accordance with some embodiments of transaction processing method 100, a transaction server authenticates a received product transfer request, and sends product information to a product server that is identified by a server identifier. The product server generates a product transfer instruction including the product information, and sends the product transfer instruction to a client device via the transaction server. The client device generates a user confirmation according to the product transfer instruction to confirm that the product transfer instruction is associated with a target product the user of the client device is interested in. The client device sends the user confirmation to the transaction server. The transaction server enables a fund transfer among the financial accounts of the user and the merchant according to the user confirmation, and sends a payment completion notice to the product server to authorize transferring the product to the client device.

In various embodiments of the application, the transaction server acts as an intermediate server between the client device and the product server. The transaction server has to authenticate the identity of the product server after it receives the product transfer request from the client device. In accordance with the authentication, the transaction server determines that the product server is a trustable server rather than a malicious server. Conversely, when the transaction server identifies a malicious product server, it terminates the interaction between the client device and the product server, and protects the client device from leaking any private information associated with the user account to the malicious server. As such, the transaction server acts as an intermediate server and improves the security level required by many secure transactions.

Figure 2:
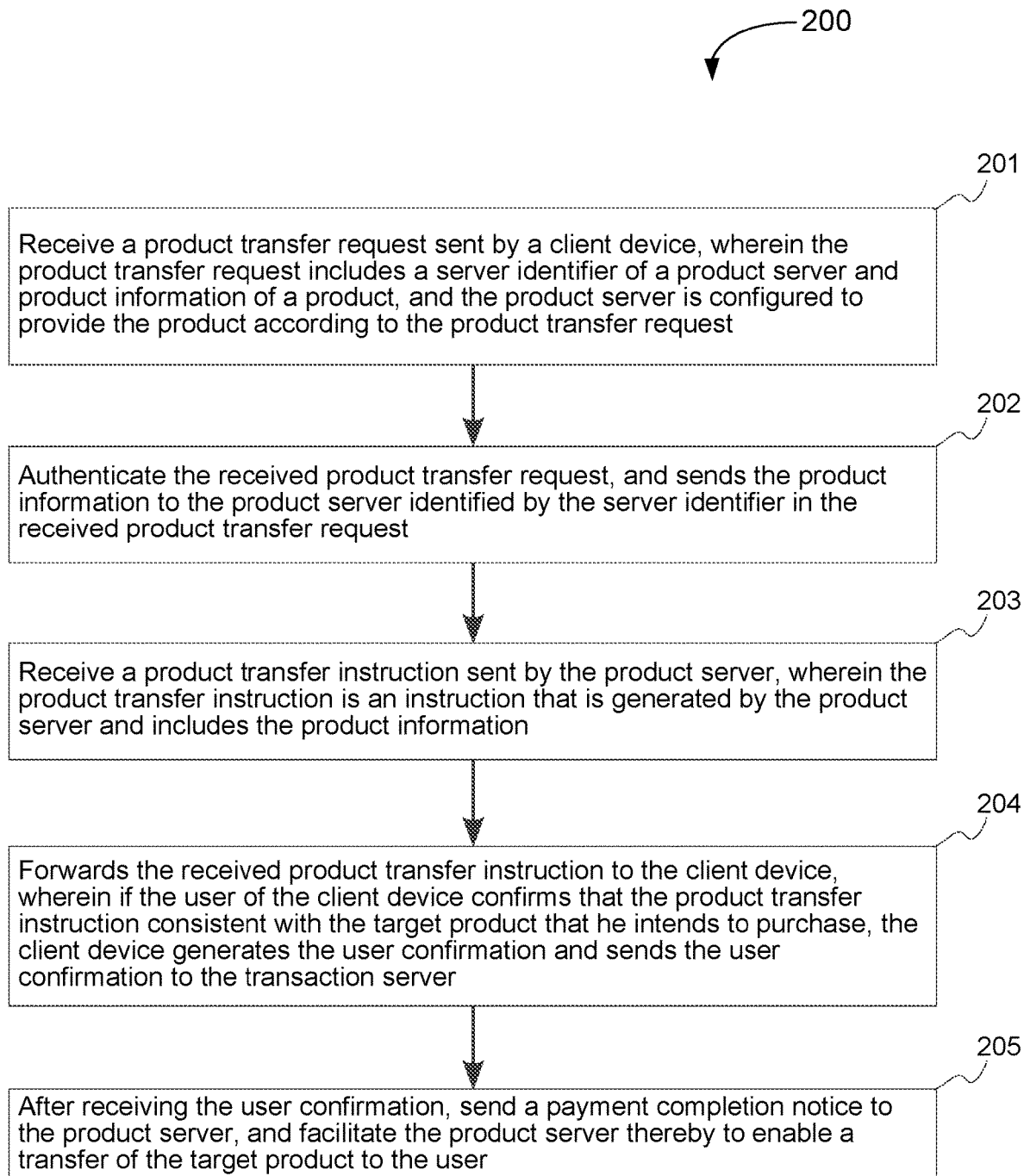

Refer to FIG. 2, which shows a flow chart of an exemplary method for implementing a secure transaction (e.g., a purchase order) according to some embodiments of the application. Optionally, transaction processing method 200 is implemented by a transaction server.

The transaction server receives (201) a product transfer request sent by a client device, and the product transfer request includes a server identifier of a product server and product information of a product. The product server is configured to provide the product according to the product transfer request. In some embodiments, a merchant that controls the product server could provide a physical product (e.g., a toy and a book) in real life according to the product transfer request. Alternatively, in some embodiments, the product includes data or programs (e.g., Stickers or Emotions in an instant messaging application, virtual equipment in a game application, and an online member service), and the merchant provides the data and program product to the client device directly from the product server.

The product server publishes information to promote the product independently of whether the product is a physical product or a virtual product. When a user reviews the published product information provided by the product server, he places a purchase order with one or more associated products. To make the purchase order, the client device obtains from the product server the server identifier of the product server and the product information of the product he is interested in, and generates the product transfer request to include these two information items. The client device then sends the product transfer request to the transaction server to request to purchase the interested product. In some embodiments, the product information provided by the product server includes a product identifier, a product name, a quantity, description and a price of each target product.

Therefore, the product transfer request includes the server identifier of the product server and the product information of the target products. When the transaction server receives the product transfer request, it properly associates each target product with the respective product server, and thereby commands the respective product server to provide the target product when the purchase order has been verified. In some embodiments, the product information provided by the product server includes a product identifier, a product name, a quantity, and a price of each target product.

After receiving the product transfer request, the transaction server authenticates (202) the received product transfer request, and sends the product information to the product server identified by the server identifier in the received product transfer request. Here, the transaction server authenticates the product transfer request to determine whether the product server is secure. Such an authentication operation avoids a product server that is a malicious server, and protects private information associated with a user or a user account from being leaked during the course of interacting with the product server.

If the transaction server authenticates the product transfer request successfully, it is determined that the product server is secure, and the product information of the product is then sent to the product server. Alternatively, if the transaction server could not authenticate the product transfer request, (i.e., if the authentication fails), it is determined that the product server is insecure, and the transaction server terminates the secure transaction (i.e., the purchase order).

The transaction server then receives (203) a product transfer instruction sent by the product server, and the product transfer instruction is an instruction that is generated by the product server and includes the product information.

The transaction server receives the product transfer instruction sent by the product server. In some implementations, the product server searches for the target product in a product database according to the product identifier included in the product information. The product server determines whether the product database includes the product identifier and whether the corresponding target product is available in the merchant's product stock. If the product identifier is found in the product database, the product server determines that the corresponding target product is available, and thereby generates a product transfer instruction including the product information. The product server then sends the product transfer instruction to the transaction server.

The transaction server forwards (204) the received product transfer instruction to the client device. If the user of the client device confirms that the product transfer instruction consistent with the target product that he intends to purchase, the client device generates the user confirmation and sends the user confirmation to the transaction server.

The transaction server sends the product transfer instruction to the client device, such that the client device displays to the user of the client device the product information in the product transfer instruction. The user confirms that the product information is associated with the product that he is interested in optionally by a user action (e.g., a click on a confirmation button displayed on the client device). Upon receiving the user's confirmation, the client device generates a user confirmation. In some embodiments, the user confirmation includes the product information and information of a first financial account, and the first financial account is associated with a user account onto which the user has logged on the client device.

After receiving the user confirmation, the transaction server sends a payment completion notice to the product server, and the product server thereby enables (205) a transfer of the target product to the user.

The transaction server obtains the information of the first financial account and a cost of the target product from the user confirmation. The transaction server also obtains information of a second financial account associated with the product server and the merchant. Then, the transaction server transfers a fund that is equal to the cost of the target product from the first financial account to the second financial account, and sends a payment completion notice to the product server. Upon receiving the payment completion notice, the product server transfers the product to the client device according to the payment completion notice.

In accordance with some embodiments of transaction processing method 200, a transaction server authenticates a received product transfer request, and sends product information to a product server that is identified by a server identifier. The transaction server then forwards a product transfer instruction returned by the product server to a client device, such that the client device could generate a user confirmation according to the product transfer instruction to confirm that the product transfer instruction is associated with a target product the user of the client device is interested in. When it receives the user confirmation from the client device, the transaction server enables a fund transfer among the financial accounts of the user and the merchant according to the user confirmation, and sends a payment completion notice to the product server to authorize transferring the product to the client device.

In various embodiments of the application, the transaction server acts as an intermediate server between the client device and the product server. The transaction server has to authenticate the identity of the product server after it receives the product transfer request from the client device. In accordance with the authentication, the transaction server determines that the product server is a trustable server rather than a malicious server. Conversely, when the transaction server identifies a malicious product server, it terminates the interaction between the client device and the product server, and protects the client device from leaking any private information associated with the user account to the malicious server. As such, the transaction server acts as an intermediate server and improves the security level required by many secure transactions.

Figure 3:
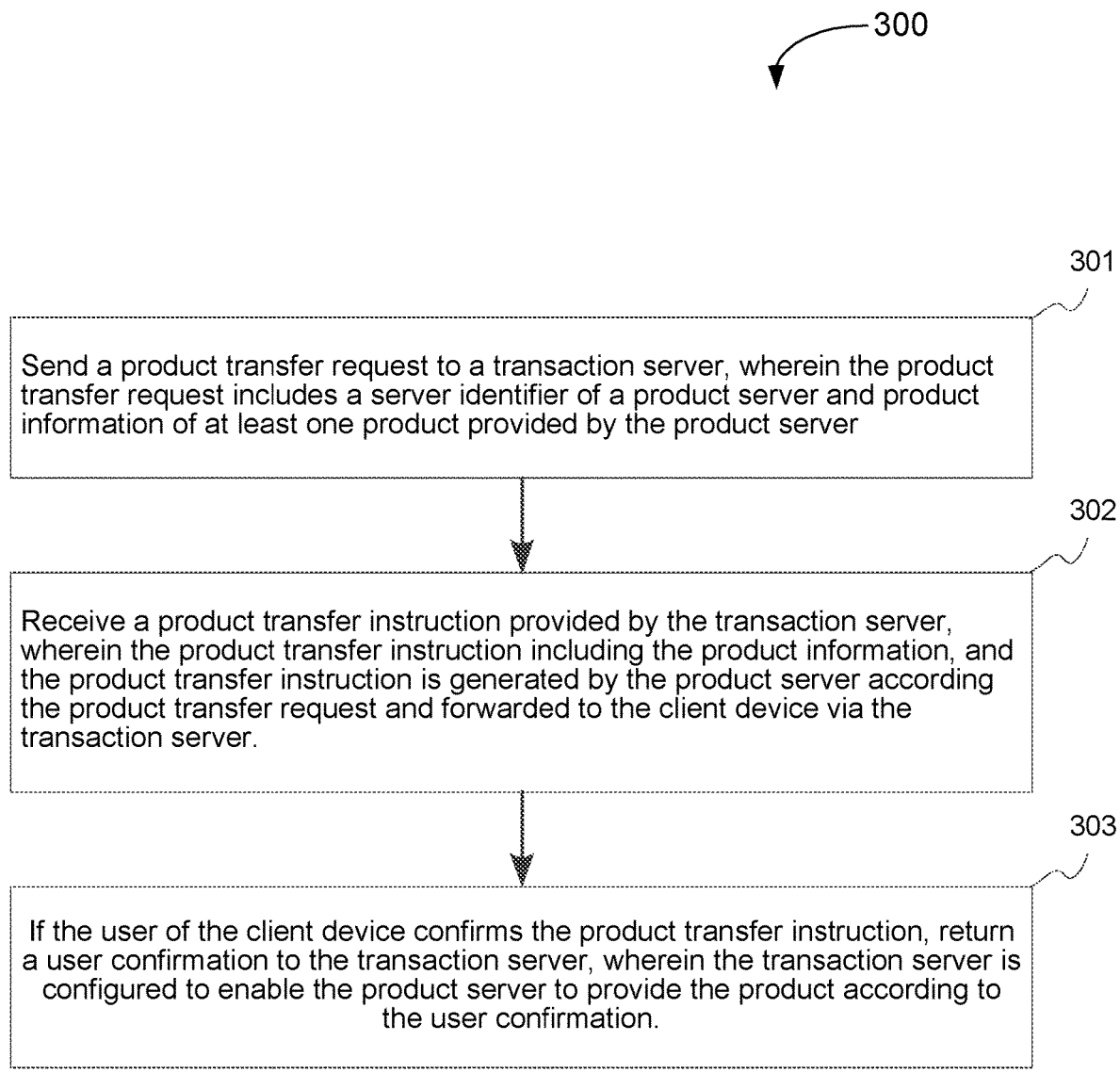

Refer to FIG. 3, which shows a flow chart of an exemplary method for implementing a secure transaction according to an embodiment of the application. Transaction processing method 300 is implemented at a client device.

The client device sends (301) a product transfer request to a transaction server. The product transfer request includes a server identifier of a product server and product information of at least one product provided by the product server. In some embodiments, a merchant that controls the product server could provide a physical product (e.g., a toy and a book) in real life according to the product transfer request. Alternatively, in some embodiments, the product includes data or programs (e.g., Stickers or Emotions in an instant messaging application, virtual equipment in a game application, and an online member service), and the merchant provides the data and program product to the client device directly from the product server.

The product server publishes information to promote the product independently of whether the product is a physical product or a virtual product. When a user reviews the published product information provided by the product server, he places a purchase order with one or more associated products. To make the purchase order, the client device obtains from the product server the server identifier of the product server and the product information of the product he is interested in, and generates the product transfer request to include these two information items. The client device then sends the product transfer request to the transaction server to request to purchase the interested product. In some embodiments, the product information provided by the product server includes a product identifier, a product name, a quantity, description and a price of each target product.

Therefore, the product transfer request includes the server identifier of the product server and the product information of the target products. When the transaction server receives the product transfer request, it properly associates each target product with the respective product server, and thereby commands the respective product server to provide the target product when the purchase order has been verified. In some embodiments, the product information provided by the product server includes a product identifier, a product name, a quantity, and a price of each target product.

The client device receives (302) a product transfer instruction provided by the transaction server. The product transfer instruction including the product information. The product transfer instruction is generated by the product server according the product transfer request, and forwarded to the client device via the transaction server. However, the transaction server provides the product transfer request to the product server only after it verifies that the product server is a trustable server and not a malicious server. Here, the transaction server authenticates the product transfer request to determine whether the product server is secure. Such an authentication operation avoids a product server that is a malicious server, and protects private information associated with a user or a user account from being leaked during the course of interacting with the product server.

If the user of the client device confirms the product transfer instruction, the client device returns (303) a user confirmation to the transaction server, and the transaction server is configured to enable the product server to provide the product according to the user confirmation.

Specifically, upon receiving the product transfer instruction from the product server via the transaction server, the client device displays the product information in the product transfer instruction. The user verifies that the product information is consistent with the target product, and generates the user confirmation and sends the user confirmation to the transaction server. In some embodiments, the user confirmation includes the product information and information of a first financial account, and the first financial account is associated with a user account onto which the user has logged on the client device.

The transaction server obtains the information of the first financial account and a cost of the target product from the user confirmation. The transaction server also obtains information of a second financial account associated with the product server and the merchant. Then, the transaction server transfers a fund that is equal to the cost of the target product from the first financial account to the second financial account, and sends a payment completion notice to the product server. Upon receiving the payment completion notice, the product server transfers the product to the client device according to the payment completion notice.

In accordance with some embodiments of transaction processing method 300, the client device receives a product transfer instruction generated by a product server in response to a product transfer request. During the course, the transaction server receives and authenticates the product transfer request, and sends product information to the product server that is identified by a server identifier. After receiving the product transfer instruction, the client device generates a user confirmation according to the product transfer instruction to confirm that the product transfer instruction is associated with a target product the user of the client device is interested in. The client device sends the user confirmation to the transaction server. The transaction server enables a fund transfer among the financial accounts of the user and the merchant according to the user confirmation, and sends a payment completion notice to the product server to authorize transferring the product to the client device.

In various embodiments of the application, the transaction server acts as an intermediate server between the client device and the product server. The transaction server has to authenticate the identity of the product server after it receives the product transfer request from the client device. In accordance with the authentication, the transaction server determines that the product server is a trustable server rather than a malicious server. Conversely, when the transaction server identifies a malicious product server, it terminates the interaction between the client device and the product server, and protects the client device from leaking any private information associated with the user account to the malicious server. As such, the transaction server acts as an intermediate server and improves the security level required by many secure transactions.

Figure 4A:
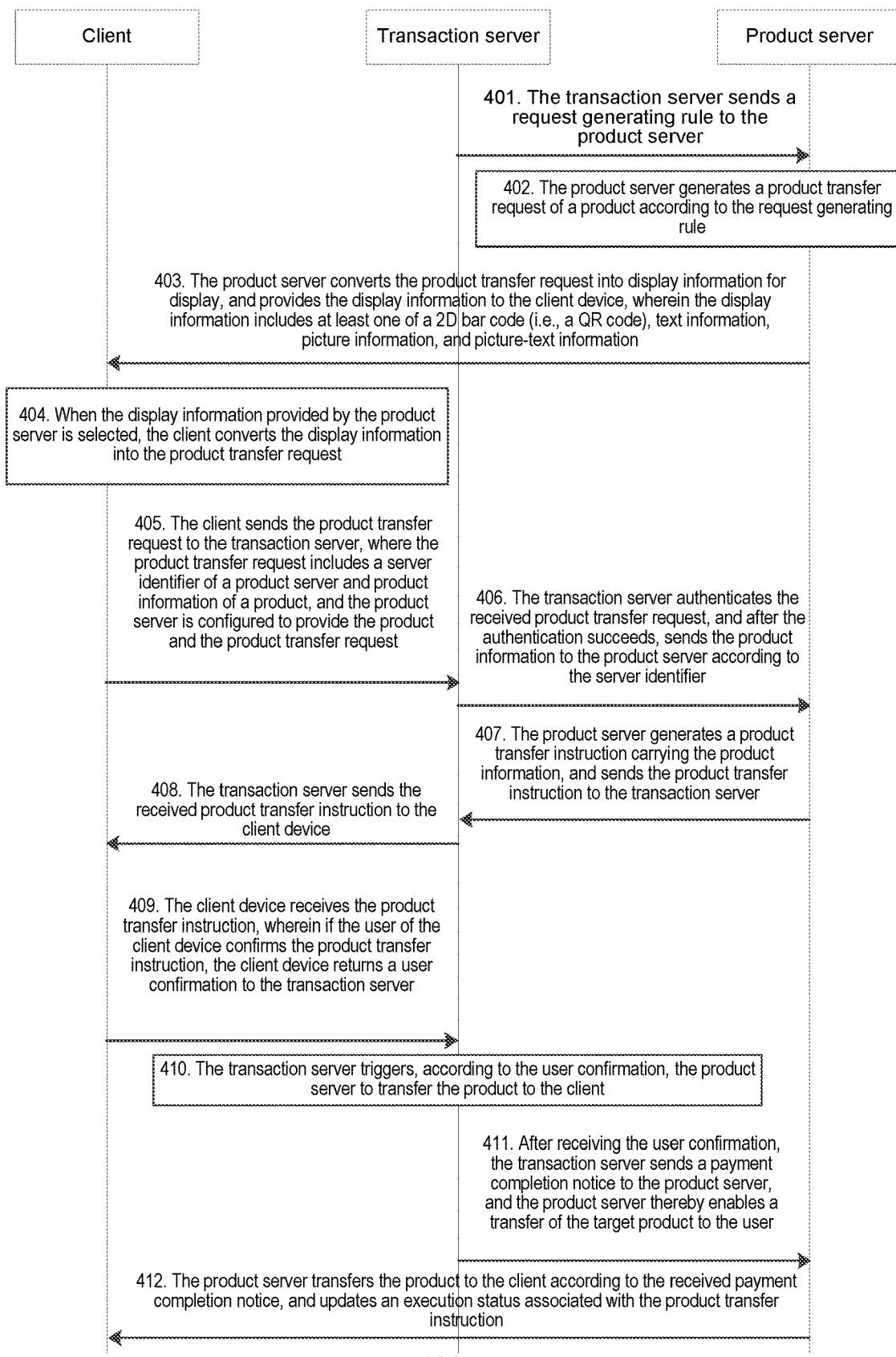
FIG. 4A is a flow chart of another exemplary method for implementing a secure transaction in accordance with some embodiments.
Figure 4B:
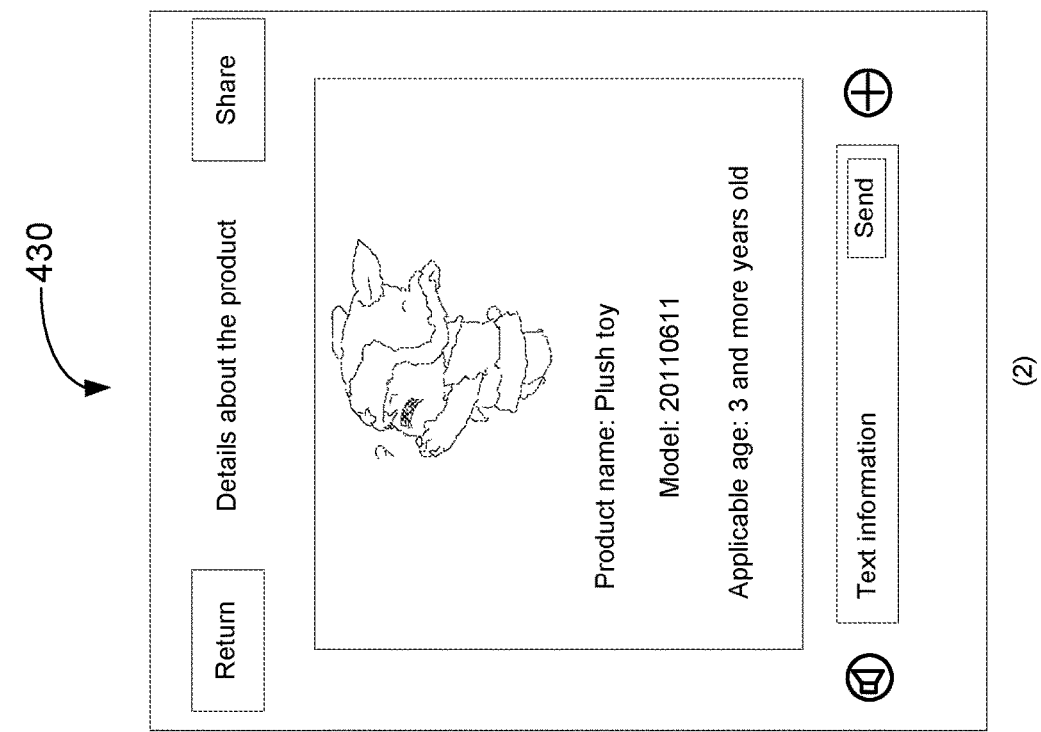
FIG. 4B illustrates two exemplary graphic user interfaces (GUIs) for implementing a secure transaction in accordance with some embodiments.
Figure 4B:
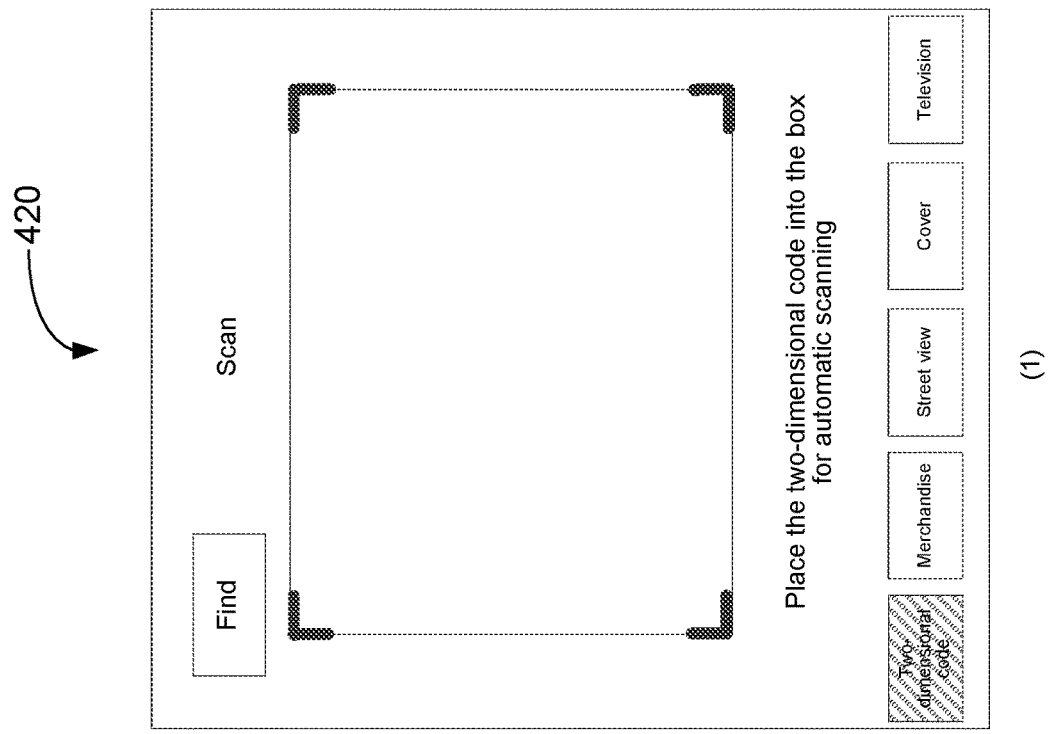
Figure 4C:
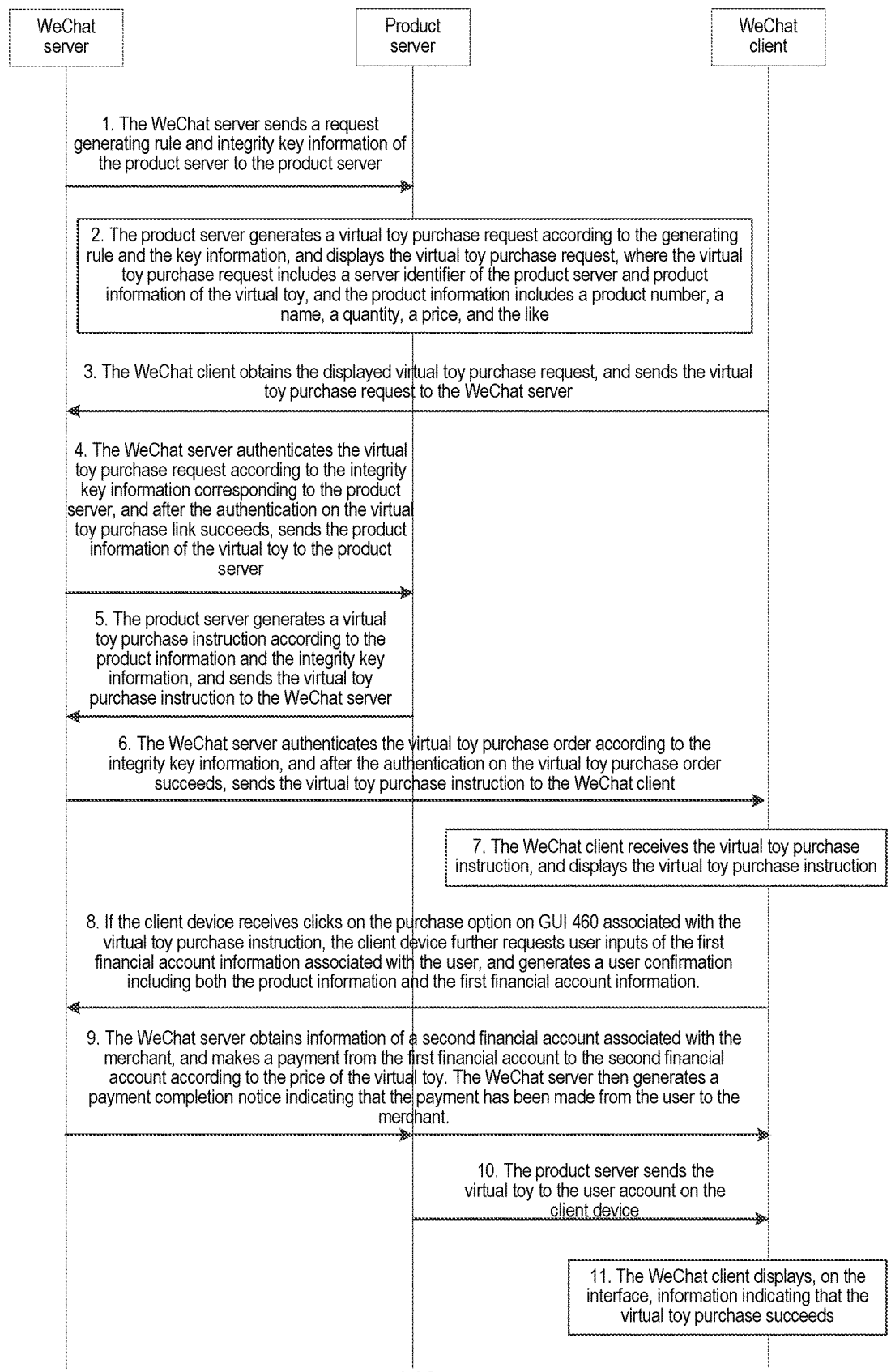
FIG. 4C is a flow chart of an exemplary method for implementing a secure transaction in accordance with some embodiments.

FIG. 4A is a flow chart of another exemplary method 400 for implementing a secure transaction in accordance with some embodiments. FIG. 4B illustrates two exemplary graphic user interfaces (GUIs) 420 and 430 for obtaining product information in accordance with some embodiments. FIG. 4C is a flow chart of an exemplary method 440 for implementing a secure transaction in accordance with some embodiments. FIG. 4D is an exemplary GUI that displays a virtual toy purchase instruction for user to confirm in accordance with some embodiments. FIG. 4E is an exemplary GUI display for entering a password for placing a purchase order for a virtual toy in accordance with some embodiments. FIG. 4F is an exemplary GUI for indicating that a virtual toy purchase is successfully completed in accordance with some embodiments.

Refer to FIG. 4A, which shows a flow chart of an exemplary method for implementing a secure transaction according to some embodiments of the application. Transaction processing method 400 is implemented in a secure transaction system including a transaction server, a product server and a client device.

A transaction server sends (401) a request generating rule to a product server. The product server publishes information to promote the product independently of whether the product is a physical product or a virtual product. When a user reviews the published product information provided by the product server, he places a purchase order with one or more associated products. To make the purchase order, the client device obtains from the product server the server identifier of the product server and the product information of the product he is interested in, and generates the product transfer request to include these two information items. The client device then sends the product transfer request to the transaction server to request to purchase the interested product. In some embodiments, the product information provided by the product server includes a product identifier, a product name, a quantity, description and a price of each target product.

In some implementations, when it publishes the product information, the product server provides a product transfer request for each published product. When a user selects a product on the client device, the product server sends the corresponding product transfer request to the client device, and therefore, the product transfer request is used to request a transfer of (i.e., purchase) a product provided by the product server. The product transfer request is then sent by a client device to the transaction server for further processing. Upon receiving the product transfer request from the client device, the transaction server identifies the product transfer request only when the received product transfer request complies with the request generating rule it has provided to the product server.

In some implementations, the request generating rule request a product transfer request include a predetermined protocol header and a predetermined content field. Optionally, the predetermined content field includes a server identifier field and a product information field. The server identifier field is used to record a server identifier of the product server. The product information field is used to record product information related to the product. The product information includes a product identifier, a product name, a product quantity, information about an exchange resource corresponding to the product, and the like. Optionally, the predetermined content field includes at least one of a signature information field, a timestamp field, and a random number field. The integrity key field is used to record signature information (i.e., a unique request identifier) created for the product transfer request. The timestamp field is used to record a time at which the product transfer request is generated. The random number field is used to record a random number that is generated with the product transfer request.

The product server generates (402) a product transfer request associated with a product according to the request generating rule provided by the transaction server. The product server creates the predetermined protocol header and the predetermined content field as specified by the request generating rule. Specifically, the product server obtains content to be added to the predetermined content field, adds the obtained content to the corresponding predetermined content field, and generates a product transfer request by combining the added predetermined content field and the predetermined protocol header.

In a specific example, as specified by the request generating rule, the predetermined content field includes a signature information field, a server identifier field, a product information field, a timestamp field, and a random number field. Then, the product transfer request is generated by the product server according to the request generating rule, and optionally represented by a link. An exemplary link associated with the product transfer request is "wx://wxpay/bizpayurl?sign=XX&appid=XX&productid=XX& timestamp=XX& noncestr=XX." In this product transfer request, "sign=XX" is associated with a signature information field, "appid=XX" is associated with a server identifier field, "productid=XX" is associated with a product information field, "timestamp=XX" is associated with a timestamp field, and "noncestr=XX" is associated with a random number field.

The product server displays (403) information concerning the product and the corresponding product transfer request on the client device associated with the user. In some embodiments, the displayed information includes one or more of a two-dimensional bar code (i.e., a quick reference code (QRC)), textual description, and a picture.

In some embodiments, the product server directly displays the product transfer request as a character string. Alternatively, in some embodiments, the product server promotes the product by displaying the product transfer request in multiple forms, such that the client device could obtain the product transfer requests in different formats. For example, the product server enables display of the product transfer request in any of a two-dimensional bar code, a textual message, a picture, and the like.

Optionally, the product server generates a two-dimensional bar code according to the product transfer request, and enables display of the bar code for the client device to scan. Optionally, the product server associates the product transfer request with a text message, and enables display of the text message. Optionally, the product server associates the product transfer request with a picture, and enables display of the picture. Optionally, the product server associates the product transfer request with a combination of a picture and a text message, and enables display of the picture and the text message. The user obtains the information contained in both the picture and the text message.

When the displayed information provided by the product server is selected by a user action on the client device, the client device obtains (404) the product transfer request associated with the displayed information. In accordance with the format of the displayed information, the client device obtains converts the displayed information into the product transfer request in different manners when the displayed information is selected by the user action.

For example, when the displayed information includes a two-dimensional bar code, the client device scans the displayed information, and converts the displayed information into the product transfer request associated with the corresponding product. When the displayed information is text information, picture information or picture-text information, the client device displays such displayed information for the user to review. Upon receiving a user action (e.g., a click) related to the displayed information, the client device converts the displayed information into the product transfer request.

In some embodiments, when the displayed information is a two-dimensional bar code, the product server enables display of the two-dimensional bar code on a display, and the client device scans the bar code displayed on the display to obtain the displayed information. The client device then converts the displayed information into the product transfer request. As shown in FIG. 4B, GUI 420 is displayed on the client device, and allows the user to scan a two-dimensional bar code.

If the displayed information is text information, the client device may receive the text information sent by the product server or forwarded by another client device, and display the text information. Upon receiving a user selection indicating that a user selects the displayed information, the client device obtains the product transfer request associated with the text information. Similarly, if the displayed information is picture information or picture-text information (e.g., a combination of a picture and a text message), the client device converts the corresponding information into the product transfer request. As shown in FIG. 4B, the GUI 430 displays picture-text information including a picture and a text message both describing a product. Specifically, GUI 430 displays a picture of a plush toy, and further displays textual information (e.g., "product name", "model", and "applicable age range") that describe the plush toy.

The client device sends (405) the product transfer request to the transaction server, and the product transfer request includes a server identifier of a product server and product information of a product. The product server is configured to provide the product in addition to the product transfer request. After obtaining the product transfer request corresponding to the product, the client device sends the product transfer request to the transaction server which continues to process the product transfer request.

It is noted that the client device logs onto a user account during the entire course of the secure transaction. Thus, the client device sends information of the user account with the product transfer request to the transaction server, such that the transaction server could notify the product server to which the product needs to be transferred.

The transaction server authenticates (406) the received product transfer request, and sends the product information to the product server as identified by the server identifier in the product transfer request.

The transaction server obtains the server identifier and the product information in the product transfer request, determines the product server providing the product according to the server identifier, and sends the product information to the determined product server. In some embodiments, the transaction server sends the server identifier and the product information to the product server in a secure format of POST (e.g., postMessage).

Here, the transaction server authenticates the product transfer request to determine whether the product server is secure. Such an authentication operation avoids a product server that is a malicious server, and protects private information associated with a user or a user account from being leaked during the course of interacting with the product server. If the transaction server authenticates the product transfer request successfully, it is determined that the product server is secure, and the product information of the product is then sent to the product server. Alternatively, if the transaction server could not authenticate the product transfer request, (i.e., if the authentication fails), it is determined that the product server is insecure, and the transaction server terminates the secure transaction (i.e., the purchase order).

In some embodiments, when the transaction server authenticates the received product transfer request, it determines at least one integrity key in a plurality of integrity keys that are stored in the transaction server according to the server identifier of the product server. The transaction server combines the at least one integrity key and the product transfer request to generate a request signature according to a predetermined request check method. The product transfer request is provided to the client device and then sent to the transaction server in association with request integrity data. After generating the request signature, the transaction server compares the request signature with the received request integrity data that is received with the product transfer request. In accordance with the request signature is consistent with the request integrity data, the transaction server authenticates the received product transfer request.

In this situation, the transaction server may authenticate the product transfer request using the integrity key. The transaction server sets a respective integrity key for each product server, and sends the integrity key to the respective product server. The product server is configured to use the corresponding integrity key to generate the respective request integrity data that accompany the product transfer request. The transaction server needs to store a database of the integrity keys, and each integrity key is associated with a specific product server.

After it generates a product transfer request, the product server generates the request integrity data by combining the product transfer request and the integrity key, and sends to the client device the request integrity data with the product transfer request. In some embodiments, the request integrity data are integrated as a portion of the product transfer request, and sent to the client device. When the transaction server receives the product transfer request from the client device, it searches locally to identify the integrity key corresponding to the server identifier in the product transfer request. The transaction server then combines the product transfer request and the identified integrity key, and generates a request signature. In a specific example, the product server generates the request integrity data by combining the integrity key with the server identifier field, the product information field, the timestamp field, and the random number field in the generated product transfer request. The transaction server generates the request signature by combining the integrity key identified in its database with the server identifier field, the product information field, the timestamp field, and the random number field in the received product transfer request.

The transaction server determines whether the request signature consistent with the request integrity data that are a portion of or accompany the product transfer request. When the request signature is consistent with the request integrity data associated with the product transfer request, the transaction server determines that the product transfer request is not tampered, and therefore, authenticates the product transfer request. When the request signature is consistent with the request integrity data associated with the product transfer request, the transaction server determines that the product transfer request is tampered, and therefore, invalidates the product transfer request.

It is noted that the client device logs onto a user account during the entire course of the secure transaction. Thus, the client device sends information of the user account with the product transfer request to the transaction server, such that the transaction server could notify the product server to which the product needs to be transferred. In addition, the product server tracks an instruction state associated with any incomplete transfer instruction in association with the user account.

After receiving the product information via the transaction server, the product server generates (407) a product transfer instruction including the product information, and returns the product transfer instruction to the transaction server. In some implementations, the product server searches for the target product in a product database according to the product identifier included in the product information. The product server determines whether the product database includes the product identifier and whether the corresponding target product is available in the merchant's product stock. If the product identifier is found in the product database, the product server determines that the corresponding target product is available, and thereby generates a product transfer instruction including the product information. The product server then sends the product transfer instruction to the transaction server.

The transaction server forwards (408) the received product transfer instruction to the client device. Optionally, the transaction server directly sends the received product transfer instruction to the client device. Alternatively, to ensure the security of the product transfer instruction, the transaction server authenticates the product transfer instruction, prior to sending the product transfer instruction to the client device.

In some embodiments, the transaction server authenticates the product transfer instruction based on the integrity key. The product server generates instruction integrity data from product transfer instruction based on the integrity key associated with the product server, incorporates the generated instruction integrity data into the product transfer instruction, and sends the product transfer instruction to the client device. After receiving the product transfer instruction, the transaction server searches locally for the integrity key according to the server identifier in the product transfer instruction, and generates an instruction signature from the received product transfer instruction based on the integrity key that is identified locally. Then, the transaction server determines whether the request signature is consistent with the instruction integrity data received in the product transfer instruction. If the request signature is consistent with the instruction integrity data received in the product transfer instruction, the transaction server determines that the product transfer instruction is not tampered, and authenticates the product transfer instruction. Alternatively, if the request signature is different from the instruction integrity data received in the product transfer instruction, the transaction server determines that the product transfer instruction is tampered, and the product transfer instruction is not authenticated.

The client device receives (409) the product transfer instruction. If the user of the client device confirms the product transfer instruction, the client device returns a user confirmation to the transaction server. Specifically, upon receiving the product transfer instruction from the product server via the transaction server, the client device displays the product information in the product transfer instruction. The user verifies that the product information is consistent with the target product that he intends to purchase optionally by a user action (e.g., a click on a confirmation button displayed on the client device). Once the product information is confirmed, the client device generates the user confirmation and sends the user confirmation to the transaction server. In some embodiments, the user confirmation includes the product information and information of a first financial account, and the first financial account is associated with a user account onto which the user has logged on the client device.

In some embodiments, the client device receives user input of information concerning the first financial account on a user interface displayed to the user. After receiving the first financial account information, the client device generates the user confirmation that incorporates the product information and information of the first financial account, and sends the user confirmation to the transaction server. In some embodiments, the first financial account information includes account information and password information.

After receiving the user confirmation, the transaction server sends (410) a payment completion notice to the product server, and the product server thereby enables a transfer of the target product to the user.

The transaction server obtains the information of the first financial account and a cost of the target product from the user confirmation. The transaction server also obtains information of a second financial account associated with the product server and the merchant. Then, the transaction server transfers a fund that is equal to the cost of the target product from the first financial account to the second financial account, and sends a payment completion notice to the product server. Upon receiving the payment completion notice, the product server transfers the product to the client device according to the payment completion notice.

In some embodiments, the transaction server sends information of the first financial account, the second financial account, and the user confirmation of the product transfer request to a third party server. The third party server arranges a payment from the first financial account to the second financial account according to the product transfer request. Upon making the payment successfully, the third party server sends a payment completion notice to the transaction server.

After receiving the user confirmation, the transaction server sends (411) a payment completion notice to the product server, and the product server thereby enables a transfer of the target product to the user. In some embodiments, the server sends the payment completion notice to the product server securely by means of POST (e.g., postMessage).

The product server receives (412) the payment completion notice, transfers the product to the client device according to the received payment completion notice and updates an execution status associated with the product transfer instruction. In some embodiments, the execution status associated with the product transfer instruction includes "complete" and "incomplete," and the product server tracks the execution status at these two situations without other execution situations (e.g., a situation in which the product transfer instruction is revoked), thereby saving an instruction maintenance cost of the product server.

It is noted that operations 401, 406, 410, and 411 are implemented by the transaction server; operations 402, 403, 407, 408, and 412 are implemented by the product server; and operations 404, 405, and 409 are implemented by the client device; independently from each other.

FIG. 4C is a flow chart of an exemplary method 440 for implementing a secure transaction in accordance with some embodiments. Specifically, transaction processing method 440 is applied to buy a virtual toy. In some embodiments, transaction processing method 440 is implemented on the platform a social network application (e.g., WeChat), and specifically on a merchant server (i.e., a product server), a WeChat server (i.e., a transaction server), and a client device that is controlled by a user. In accordance with transaction processing method 440, a user of the client device has logged onto his or her user account of the social network application, and makes the purchase order on the user account. The purchase order is implemented as follows:

1. The WeChat server sends a request generating rule and integrity key information associated with the merchant server to the merchant server.

2. The merchant server generates a virtual toy purchase request according to the request generating rule and the integrity key information, and when the virtual toy purchase request enables the display of the virtual toy on a display of the client device. The virtual toy purchase request includes a server identifier of the merchant server and product information of the virtual toy, and the product information includes a merchandise number, a name, a quantity, an amount, and the like.

In some embodiments, the merchant server converts the virtual toy purchase request into at least one of a two-dimensional bar code, text information, picture information, and picture-text information for display to the user of the client device.

3. The client device accesses the displayed virtual toy purchase request, and forwards the virtual toy purchase request to the WeChat server to indicate that the user of the client device is interested in the displayed virtual toy.

The merchant server publishes information about the virtual toy (e.g., product information, pictorial and textual description and buyer feedback) on the display of the client device. When the client device displays the information about the virtual toy, the user determines whether to purchase the virtual toy based on the displayed information about the virtual toy.

The client device sends information of the WeChat user account together with the virtual toy purchase request to the WeChat server. The WeChat server tracks and notifies the merchant server of who needs to purchase the virtual toy.

4. The WeChat server authenticates the virtual toy purchase request according to the integrity key information corresponding to the merchant server, and after the authentication on the virtual toy purchase request succeeds, sends the product information of the virtual toy to the merchant server.

In some embodiments, the WeChat server sends user information of the user associated with the user account to the merchant server, and the merchant server determines which user needs to purchase the virtual toy.

5. The merchant server generates a virtual toy purchase instruction according to the product information and the integrity key information, and sends the virtual toy purchase instruction to the WeChat server.

6. The WeChat server authenticates the virtual toy purchase instruction according to the integrity key information, and after the virtual toy purchase instruction is authenticated, sends the virtual toy purchase instruction to the client device.

7. The client device receives the virtual toy purchase instruction, and displays the virtual toy purchase instruction to the user of the client device.

FIG. 4D is an exemplary GUI 460 that displays a virtual toy purchase instruction for user to confirm in accordance with some embodiments. GUI 460 displays information about the virtual toy, such as its name ("plush toy"), price ("35 dollars"), merchant name ("XX company in Shenzhen"), and quantity ("1"). GUI 460 also displays a purchase option 462 for purchase confirmation. If the user clicks the purchase option 462, the client device determines that the virtual toy purchase instruction is triggered. Alternatively, the user optionally clicks on a cancellation option 464 to forgo the purchase request.

8. If the client device receives clicks on the purchase option on GUI 460 associated with the virtual toy purchase instruction, the client device further requests user inputs of the first financial account information associated with the user, and generates a user confirmation including both the product information and the first financial account information. The user confirmation confirms to the WeChat server that the user intends to buy the virtual toy as displayed on the client device to the user.

In some embodiments, to ensure the security of a virtual toy purchase process, after obtaining the first financial account information, the client device prompts the user to input the password of the first financial account. For example, the first financial account is associated with an XX bank card that has last four digits as "4032." FIG. 4E is an exemplary GUI display 470 for entering a password for placing a purchase order for a virtual toy in accordance with some embodiments. Specifically, GUI display 470 displays a message that says "use the XX bank card with last four digits as 4032 to purchase one plush toy having a price of 35," and an input box 472 for receiving the password. After obtaining the password input from the user, the client device generates a user confirmation of the purchase instruction based on the display product information, and sends the user confirmation of the purchase order to the WeChat server.

9. The WeChat server obtains information of a second financial account associated with the merchant, and makes a payment from the first financial account to the second financial account according to the price of the virtual toy. The WeChat server then generates a payment completion notice indicating that the payment has been made from the user to the merchant.

10. The merchant server delivers the virtual toy to the user account associated with the client device.

11. The client device displays, on its social network platform (e.g., the WeChat interface), an order completion message indicating that the virtual toy has been successfully purchased and delivered.

FIG. 4F is an exemplary GUI 480 for indicating that a virtual toy purchase is successfully completed in accordance with some embodiments. GUI 480 displays a merchant name ("XX company in Shenzhen"), an order identifier ("54691856"), a virtual toy name ("plush toy"), a cost ("35 dollars"), a quantity of ("1"), and a transaction time ("2013-12-25 12:30").

In accordance with some embodiments of transaction processing method 440, a transaction server (e.g., a WeChat server) authenticates a received product transfer request (e.g., a virtual toy purchase request), and sends product information to a product server (e.g., a merchant server) that is identified by a server identifier. The product server generates a product transfer instruction including the product information, and sends the product transfer instruction to a client device via the transaction server. The client device generates a user confirmation according to the product transfer instruction to confirm that the product transfer instruction is associated with a target product the user of the client device is interested in. The client device sends the user confirmation to the transaction server. The transaction server enables a fund transfer among the financial accounts of the user and the merchant according to the user confirmation, and sends a payment completion notice to the product server to authorize transferring the product to the client device.

In various embodiments of the application, the transaction server acts as an intermediate server between the client device and the product server. The transaction server has to authenticate the identity of the product server after it receives the product transfer request from the client device. In accordance with the authentication, the transaction server determines that the product server is a trustable server rather than a malicious server. Conversely, when the transaction server identifies a malicious product server, it terminates the interaction between the client device and the product server, and protects the client device from leaking any private information associated with the user account to the malicious server. As such, the transaction server acts as an intermediate server and improves the security level required by many secure transactions.

In addition, a product transfer request provided by the product server is converted into information for display on the client device. The client device obtains the display information in the product transfer request. When the user selects a product according to the displayed information, the client device converts the displayed information into the product transfer request and sends the product transfer request to the transaction server. The information displayed to the client device is one of a two-dimensional bar code, text information, picture information, and picture-text information, and therefore, the client device could obtain the product transfer request in multiple ways.

Figure 5:
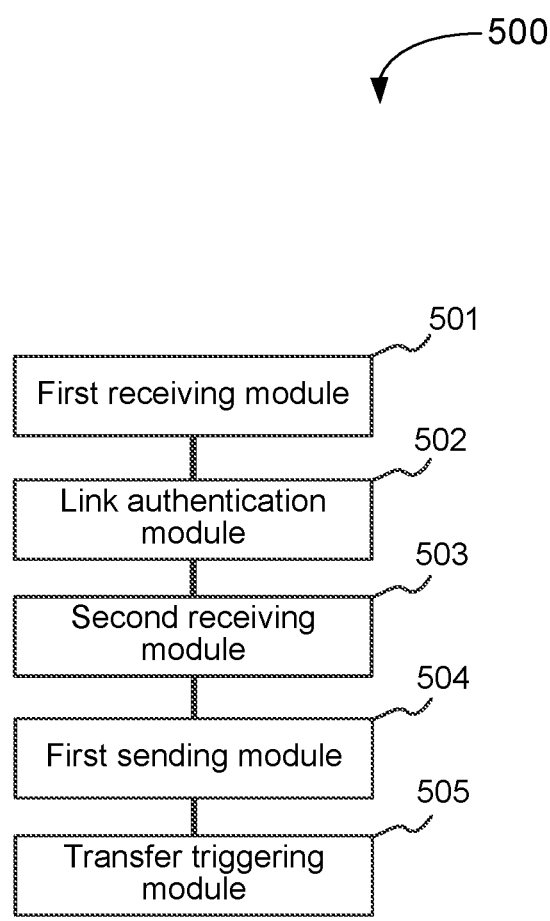
FIGS. 5-6 are block diagrams of two exemplary systems that process a secure transaction (e.g., a purchase order) in accordance with some embodiments.
Figure 6:
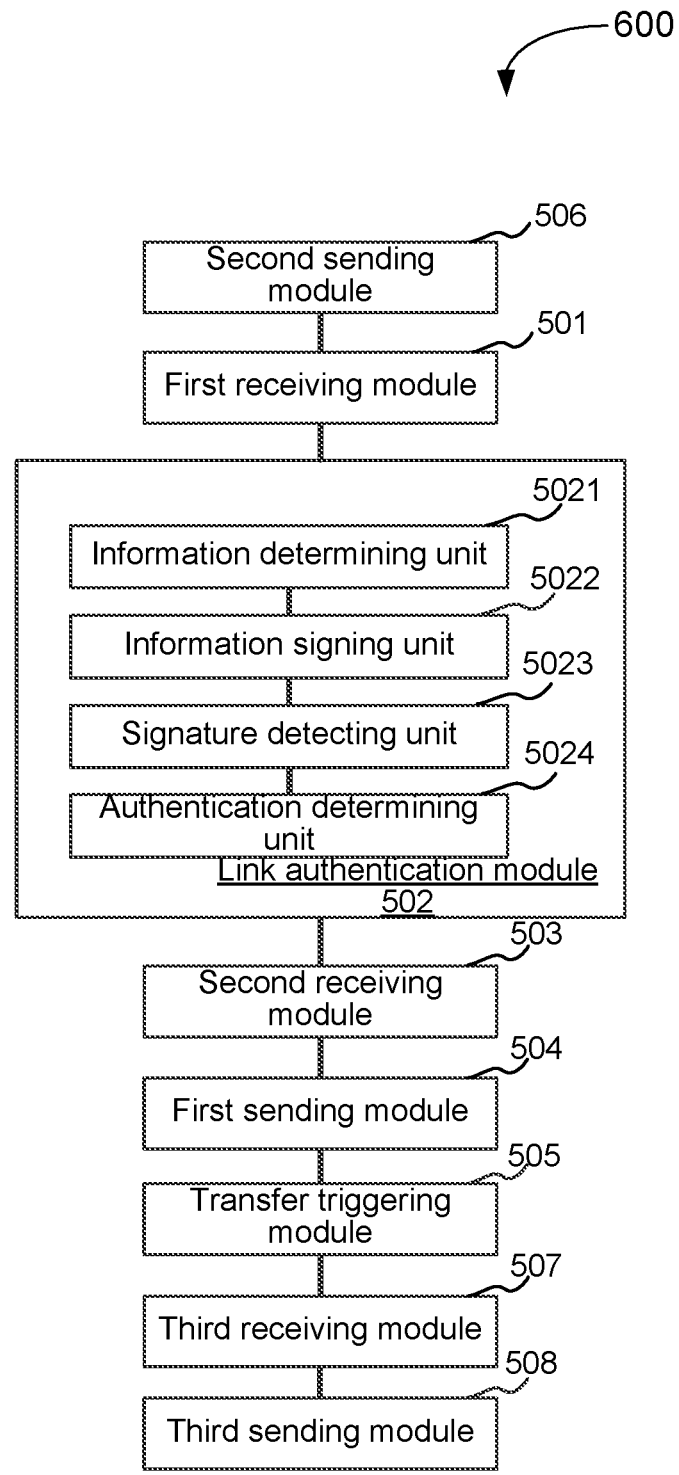

FIGS. 5 and 6 are block diagrams of two exemplary systems 500 and 600 that process a secure transaction (e.g., a purchase order) in accordance with some embodiments. Transaction processing system 500 is implemented in a transaction server. Transaction processing system 500 includes: a first receiving module 501, a request authentication module 502, a second receiving module 503, a first sending module 504, and a transfer triggering module 505.

The first receiving module 501 is configured to receive a product transfer request sent by a client device. The product transfer request includes a server identifier of a product server and product information of a product, and the product server is configured to provide the product and the product transfer request.

The request authentication module 502 is configured to authenticate the product transfer request received by the first receiving module 501, and after the authentication succeeds, send the product information to the product server according to the server identifier.

The second receiving module 503 is configured to receive a product transfer instruction sent by the product server. The product transfer instruction is an instruction that is generated by the product server and carries the product information sent by the request authentication module 502.

The first sending module 504 is configured to send the product transfer instruction received by the second receiving module 503 to the client device, so that after receiving a user confirmation that is triggered according to the product transfer instruction and used for performing transfer confirmation on the product corresponding to the product information, the client device sends the user confirmation to the transaction server.

The transfer triggering module 505 is configured to enable, according to the received user confirmation, the product server to transfer the product to the client device.

In accordance with some embodiments of transaction processing system 500, a transaction server authenticates a received product transfer request, and sends product information to a product server that is identified by a server identifier. The product server generates a product transfer instruction including the product information, and sends the product transfer instruction to a client device via the transaction server. The client device generates a user confirmation according to the product transfer instruction to confirm that the product transfer instruction is associated with a target product the user of the client device is interested in. The client device sends the user confirmation to the transaction server. The transaction server enables a fund transfer among the financial accounts of the user and the merchant according to the user confirmation, and sends a payment completion notice to the product server to authorize transferring the product to the client device.

In various embodiments of the application, the transaction server acts as an intermediate server between the client device and the product server. The transaction server has to authenticate the identity of the product server after it receives the product transfer request from the client device. In accordance with the authentication, the transaction server determines that the product server is a trustable server rather than a malicious server. Conversely, when the transaction server identifies a malicious product server, it terminates the interaction between the client device and the product server, and protects the client device from leaking any private information associated with the user account to the malicious server. As such, the transaction server acts as an intermediate server and improves the security level required by many secure transactions.

Refer to FIG. 6, which shows a structural block diagram of a transaction processing system 600 according to some embodiments of the application. Transaction processing system 600 is implemented in a transaction server. The transaction processing system includes: a first receiving module 501, a request authentication module 502, a second receiving module 503, a first sending module 504, and a transfer triggering module 505.

The first receiving module 501 is configured to receive a product transfer request sent by a client device, where the product transfer request includes a server identifier of a product server and product information of a product, and the product server is configured to provide the product and the product transfer request.

The request authentication module 502 is configured to authenticate the product transfer request received by the first receiving module 501, and after the authentication succeeds, send the product information to the product server according to the server identifier.

The second receiving module 503 is configured to receive a product transfer instruction sent by the product server, where the product transfer instruction is an instruction that is generated by the product server and carries the product information sent by the request authentication module 502.

The first sending module 504 is configured to send the product transfer instruction received by the second receiving module 503 to the client device, so that after receiving a user confirmation that is triggered according to the product transfer instruction and used for performing transfer confirmation on the product corresponding to the product information, the client device sends the user confirmation to the transaction server.

The transfer triggering module 505 is configured to trigger, according to the received user confirmation, the product server to transfer the product to the client device.

In some embodiments, the system further includes a second sending module 506. Second sending module 506 is configured to send a request generating rule to the product server, so that the product server generates the product transfer request of the product according to the request generating rule, converts the product transfer request into display information for display, and provides the display information to the client device; and when the client device obtains the displayed information and converts the displayed information into the product transfer request. Exemplary displayed information includes a two-dimensional bar code, text information, picture information, and picture-text information.

In some embodiments, the system further includes: a third receiving module 507 and a third sending module 508. Third receiving module 507 is configured to receive a payment completion notice indicating that the user account has made the payment and that the product server is authorized to transfer the product to the client device. Third sending module 508 is configured to send the payment completion notice obtained by the third receiving module 507 to the product server. The product server transfers the product to the client device according to the received payment completion notice, and maintains an execution state of the product transfer instruction.

In some embodiments, the request authentication module 502 includes: an information determining unit 5021, an information signing unit 5022, a signature detecting unit 5023, and an authentication determining unit 5024.

The information determining unit 5021 is configured to determine at least one integrity key corresponding to the server identifier among a plurality of integrity keys in an integrity key database in the transaction server.

The information signing unit 5022 is configured to create request/instruction signatures by combining the product transfer request/instruction and the integrity key information determined by the information determining unit 5021.

The signature detecting unit 5023 is configured to detect whether the request/instruction signatures obtained by the information signing unit 5022 is consistent with request/instruction integrity data included in the product transfer request/instruction. The request/instruction integrity data included in the product transfer request/instruction is generated in the product server by combining the product transfer request/instruction and the corresponding integrity key information.

The authentication determining unit 5024 is configured to: when a detecting result of the signature detecting unit 5023 is that the request signature is consistent with the integrity data included in the product transfer request, determine that the authentication on the product transfer request succeeds.

In accordance with some embodiments of transaction processing system 600, a transaction server (e.g., a WeChat server) authenticates a received product transfer request (e.g., a virtual toy purchase request), and sends product information to a product server (e.g., a merchant server) that is identified by a server identifier. The product server generates a product transfer instruction including the product information, and sends the product transfer instruction to a client device via the transaction server. The client device generates a user confirmation according to the product transfer instruction to confirm that the product transfer instruction is associated with a target product the user of the client device is interested in. The client device sends the user confirmation to the transaction server. The transaction server enables a fund transfer among the financial accounts of the user and the merchant according to the user confirmation, and sends a payment completion notice to the product server to authorize transferring the product to the client device.

In various embodiments of the application, the transaction server acts as an intermediate server between the client device and the product server. The transaction server has to authenticate the identity of the product server after it receives the product transfer request from the client device. In accordance with the authentication, the transaction server determines that the product server is a trustable server rather than a malicious server. Conversely, when the transaction server identifies a malicious product server, it terminates the interaction between the client device and the product server, and protects the client device from leaking any private information associated with the user account to the malicious server. As such, the transaction server acts as an intermediate server and improves the security level required by many secure transactions.

In addition, a product transfer request provided by the product server is converted into information for display on the client device. The client device obtains the display information in the product transfer request. When the user selects a product according to the displayed information, the client device converts the displayed information into the product transfer request and sends the product transfer request to the transaction server. The information displayed to the client device is one of a two-dimensional bar code, text information, picture information, and picture-text information, and therefore, the client device could obtain the product transfer request in multiple ways.

Figure 7:
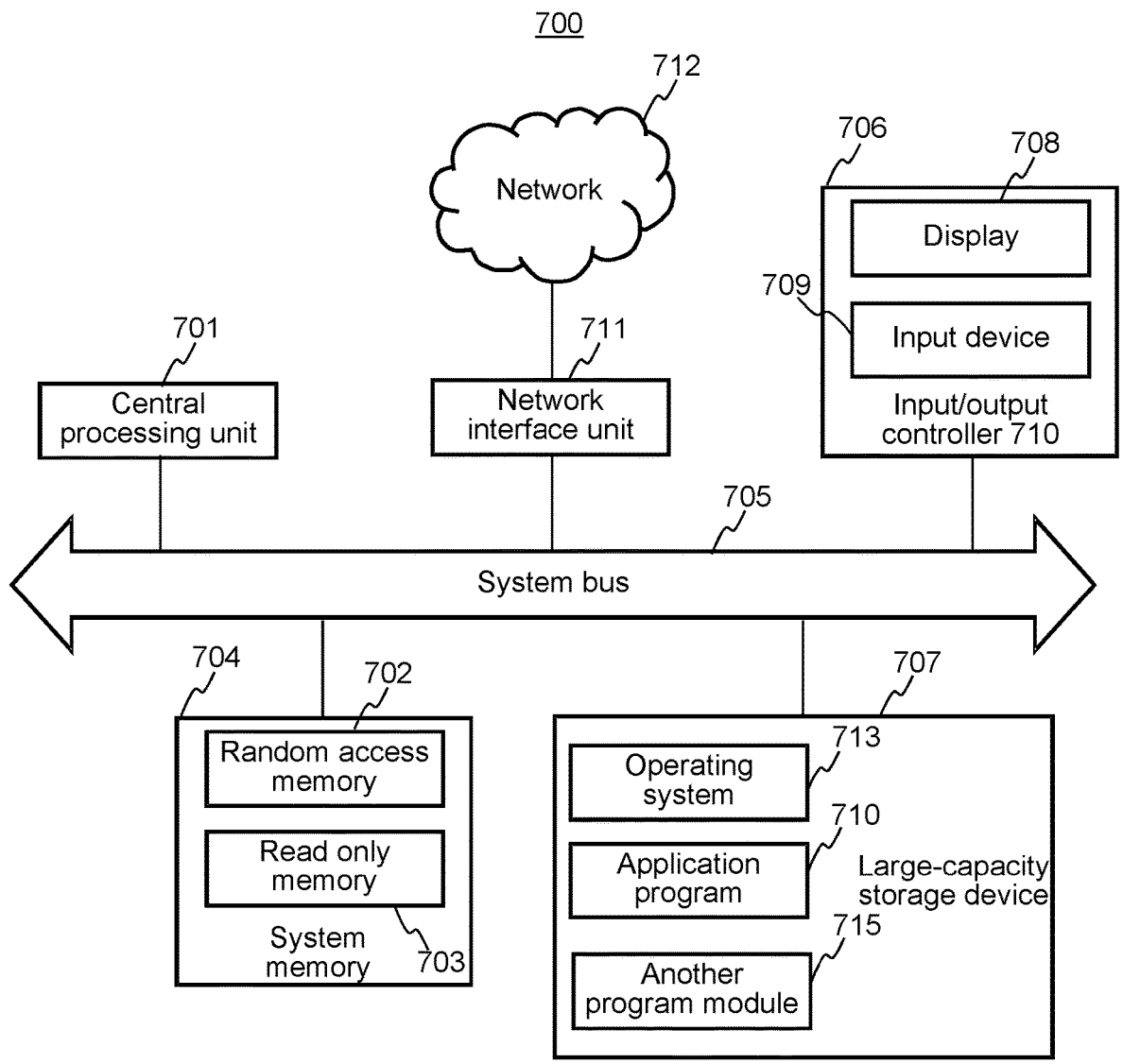
FIG. 7 is a block diagram of an exemplary server system that enables a secure transaction in accordance with some embodiments.

FIG. 7 is a block diagram of an exemplary transaction server system 700 that enables a secure transaction in accordance with some embodiments. The transaction server 700 includes a central processing unit (CPU) 701, a system memory 704 including a random access memory (RAM) 702 and a read only memory (ROM) 703, and a system bus 705 connecting the system memory 704 and the CPU 701. The transaction server 700 further includes a basic input/output system (I/O system) 706 helping information transmission between components in a computer, and a large-capacity storage device 707 configured to store an operating system 713, an application program 710, and another program module 715.

The basic I/O system 706 includes a display 708 configured to display information, and an input device 709 configured to input information by a user, such as a mouse or a keyboard. The display 708 and the input device 709 both connect to the CPU 701 by connecting to an I/O controller 710 of the system bus 705. The basic I/O system 706 may further include the I/O controller 710, so as to receive and process input from multiple other devices such as a keyboard, a mouse, and an electronic stylus. Similarly, the I/O controller 710 further provides output to a display screen, a printer, or another type of output device.

The large-capacity storage device 707 connects to the CPU 701 by connecting to a large-capacity storage controller (not shown) of the system bus 705. The large-capacity storage device 707 and a computer readable medium associated with the large-capacity storage device 707 provide non-volatile storage to the transaction server 700. That is, the large-capacity storage device 707 may include a computer readable medium (not shown) such as a hard disk or a CD-ROM.

In general, the computer readable medium may include a computer storage medium and communications medium. The computer storage medium includes volatile, non-volatile, removable, and non-removable media implemented by using any method or technology, so as to store information such as a computer readable instruction, a data structure, a program module, or other data. The computer storage medium includes a RAM, a ROM, an EPROM, an EEPROM, a flash memory or another solid-state storage technology, a CD-ROM, a DVD or another optical storage device, a tape cartridge, a tape, a disk storage device or another magnetic storage device. Certainly, persons in the art may know that the computer storage medium is not limited to the foregoing. The system memory 704 and the large-capacity storage device 707 may be collectively referred to as a memory.

According to the embodiments of the application, the transaction server 700 may run by connecting to a remote computer in a network by using the network such as the Internet. That is, the transaction server 700 may connect to a network 712 by using a network interface unit 711 on the system bus 705, or in other words, the network interface unit 711 may also be used to connect to another type of network or remote computer system (not shown).

The memory further includes one or more programs. The one or more programs are stored in the memory, and have the following functions:

receiving a product transfer request sent by a client device, where the product transfer request includes a server identifier of a product server and product information of a product, and the product server is configured to provide the product and the product transfer request;

authenticating the received product transfer request, and after the authentication succeeds, sending the product information to the product server according to the server identifier;

receiving a product transfer instruction sent by the product server, where the product transfer instruction is an instruction that is generated by the product server and carries the product information;

sending the product transfer instruction to the client device, so that after receiving a user confirmation that is triggered according to the product transfer instruction and used for performing transfer confirmation on the product corresponding to the product information, the client device sends the user confirmation to the transaction server; and triggering, according to the received user confirmation, the product server to transfer the product to the client device.

Optionally, before the receiving a product transfer request sent by a client device, the following is further included:

sending a product transfer request generating rule to the product server, so that the product server generates the product transfer request of the product according to the request generating rule, converts the product transfer request into display information for display, and provides the displayed information to the client device; and when the displayed information is triggered, the client device converts the displayed information into the product transfer request, where the displayed information includes at least one of a two-dimensional bar code, text information, picture information, and picture-text information.

Optionally, after the triggering, according to the received user confirmation, the product server to transfer the product to the client device, the following is further included:

receiving a notification message indicating that the product server is successfully triggered to transfer the product to the client device; and sending the notification message to the product server, so that the product server transfers the product to the client device according to the received notification message, and maintains an execution state of the product transfer instruction.

Optionally, the authenticating the received product transfer request includes:

determining, from at least one piece of prestored integrity key information, integrity key information corresponding to the server identifier;

generating a request signature from the product transfer request according to the determined integrity key information, to obtain signature information;

detecting whether the request signature is consistent with the request integrity data included in the product transfer request, where the request integrity data included in the product transfer request is obtained by the product server by combining the product transfer request and the integrity key information sent by the transaction server; and if a detecting result is that the request signature is consistent with the request integrity data included in the product transfer request, determining that the authentication on the product transfer request succeeds.

Figures 8, 9, 10:
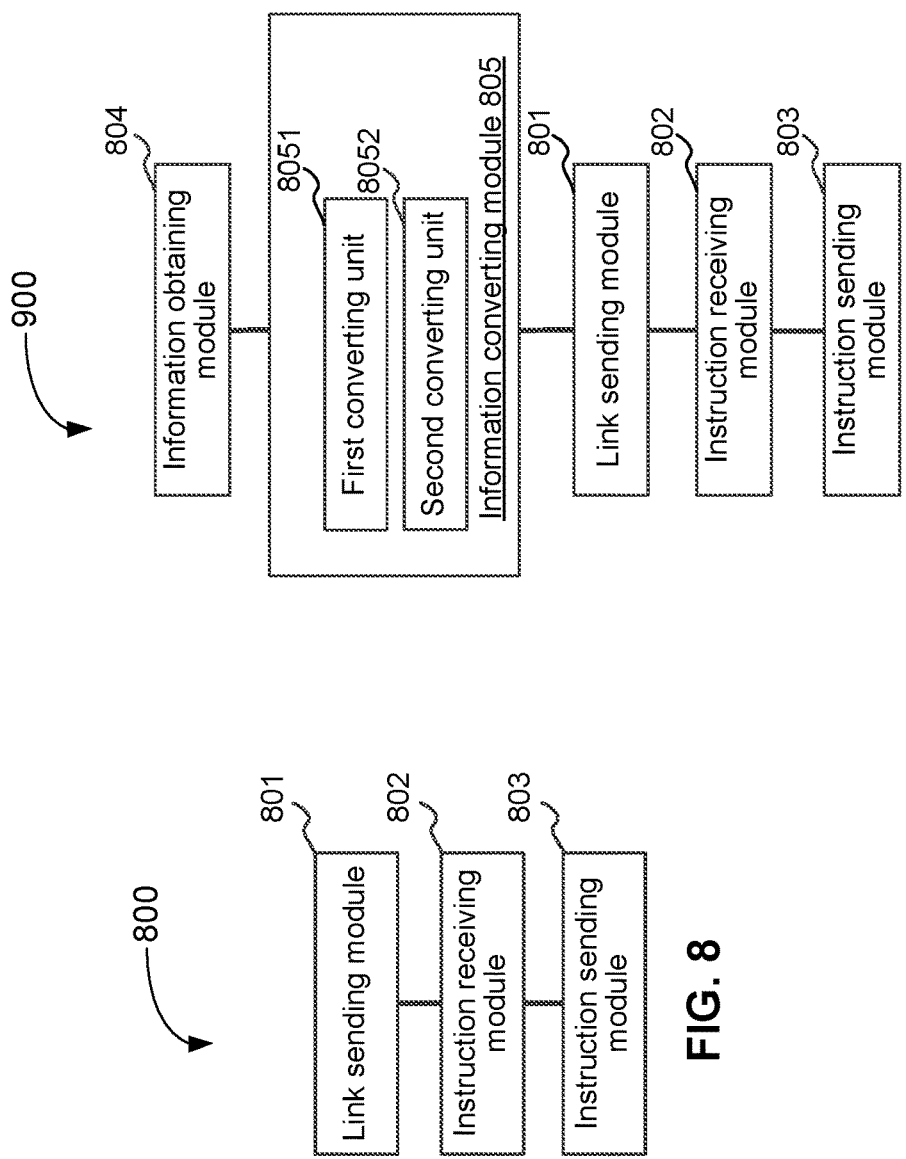
FIGS. 8-10 are block diagrams of three exemplary systems that process a secure transaction in accordance with some embodiments.

FIGS. 8-10 are block diagrams of three exemplary systems that process a secure transaction in accordance with some embodiments.

Refer to FIG. 8, which shows a structural block diagram of a transaction processing system 800 according to an embodiment of the application. The transaction processing system 800 is implemented in a client device. The transaction processing system includes: a request sending module 801, an instruction receiving module 802, and an instruction sending module 803.

The request sending module 801 is configured to send a product transfer request to a transaction server, where the product transfer request includes a server identifier of a product server and product information of a product, and the product server is configured to provide the product and the product transfer request.

The instruction receiving module 802 is configured to receive a product transfer instruction that is sent by the transaction server according to the product transfer request, where the product transfer instruction is an instruction that carries the product information and is generated by the product server after the transaction server sends the product information to the product server according to the server identifier after the transaction server authenticates the received product transfer request and the authentication succeeds.

The instruction sending module 803 is configured to: if a user confirmation that is triggered according to the product transfer instruction received by the instruction receiving module 802 and used for performing transfer confirmation on a product corresponding to the product information is received, send the user confirmation to the transaction server, so that the transaction server triggers, according to the user confirmation, the product server to transfer the product to the client device.

In accordance with some embodiments of transaction processing system 800, a transaction server (e.g., a WeChat server) authenticates a received product transfer request (e.g., a virtual toy purchase request), and sends product information to a product server (e.g., a merchant server) that is identified by a server identifier. The product server generates a product transfer instruction including the product information, and sends the product transfer instruction to a client device via the transaction server. The client device generates a user confirmation according to the product transfer instruction to confirm that the product transfer instruction is associated with a target product the user of the client device is interested in. The client device sends the user confirmation to the transaction server. The transaction server enables a fund transfer among the financial accounts of the user and the merchant according to the user confirmation, and sends a payment completion notice to the product server to authorize transferring the product to the client device.

In various embodiments of the application, the transaction server acts as an intermediate server between the client device and the product server. The transaction server has to authenticate the identity of the product server after it receives the product transfer request from the client device. In accordance with the authentication, the transaction server determines that the product server is a trustable server rather than a malicious server. Conversely, when the transaction server identifies a malicious product server, it terminates the interaction between the client device and the product server, and protects the client device from leaking any private information associated with the user account to the malicious server. As such, the transaction server acts as an intermediate server and improves the security level required by many secure transactions.

Refer to FIG. 9, which shows a structural block diagram of a transaction processing system 900 according to some embodiments of the application. The transaction processing system is implemented in a client device. The transaction processing system includes: a request sending module 801, an instruction receiving module 802, and an instruction sending module 803.

The request sending module 801 is configured to send a product transfer request to a transaction server, where the product transfer request includes a server identifier of a product server and product information of a product, and the product server is configured to provide the product and the product transfer request.

The instruction receiving module 802 is configured to receive a product transfer instruction that is sent by the transaction server according to the product transfer request, where the product transfer instruction is an instruction that carries the product information and is generated by the product server after the transaction server sends the product information to the product server according to the server identifier after the transaction server authenticates the received product transfer request and the authentication succeeds.

The instruction sending module 803 is configured to: if a user confirmation that is triggered according to the product transfer instruction received by the instruction receiving module 802 and used for performing transfer confirmation on a product corresponding to the product information is received, send the user confirmation to the transaction server, so that the transaction server triggers, according to the user confirmation, the product server to transfer the product to the client device.

In some embodiments, the system further includes: an information obtaining module 804 and an information converting module 805.

The information obtaining module 804 is configured to obtain display information provided by the product server, where the displayed information is obtained by the product server by converting a product transfer request of a product that is generated according to a product transfer request generating rule sent by the transaction server, and the displayed information includes at least one of a two-dimensional bar code, text information, picture information, and picture-text information.

The information converting module 805 is configured to: when the displayed information obtained by the information obtaining module 804 is triggered, convert the displayed information into the product transfer request.

In some embodiments, the information converting module 805 includes: a first converting unit 8051 and a second converting unit 8052.

The first converting unit 8051 is configured to: if the displayed information is a two-dimensional bar code, scan the displayed information, and convert the displayed information into the product transfer request.

The second converting unit 8052 is configured to: if the displayed information is text information or picture information or picture-text information, display the obtained display information, and when a selection signal indicating that the displayed information is selected is received, convert the displayed information into the product transfer request.

In accordance with some embodiments of transaction processing system 900, a transaction server (e.g., a WeChat server) authenticates a received product transfer request (e.g., a virtual toy purchase request), and sends product information to a product server (e.g., a merchant server) that is identified by a server identifier. The product server generates a product transfer instruction including the product information, and sends the product transfer instruction to a client device via the transaction server. The client device generates a user confirmation according to the product transfer instruction to confirm that the product transfer instruction is associated with a target product the user of the client device is interested in. The client device sends the user confirmation to the transaction server. The transaction server enables a fund transfer among the financial accounts of the user and the merchant according to the user confirmation, and sends a payment completion notice to the product server to authorize transferring the product to the client device.

In various embodiments of the application, the transaction server acts as an intermediate server between the client device and the product server. The transaction server has to authenticate the identity of the product server after it receives the product transfer request from the client device. In accordance with the authentication, the transaction server determines that the product server is a trustable server rather than a malicious server. Conversely, when the transaction server identifies a malicious product server, it terminates the interaction between the client device and the product server, and protects the client device from leaking any private information associated with the user account to the malicious server. As such, the transaction server acts as an intermediate server and improves the security level required by many secure transactions.

In addition, a product transfer request provided by the product server is converted into information for display on the client device. The client device obtains the display information in the product transfer request. When the user selects a product according to the displayed information, the client device converts the displayed information into the product transfer request and sends the product transfer request to the transaction server. The information displayed to the client device is one of a two-dimensional bar code, text information, picture information, and picture-text information, and therefore, the client device could obtain the product transfer request in multiple ways.

Refer to FIG. 10, which shows a structural block diagram of a secure transaction system according to an embodiment of the application. The secure transaction system includes: a client device 1001, a transaction server 1002, and a product server 1003. The client device 1001, the transaction server 1002, and the product server 1003 are connected by using a wired network or a wireless network.

The client device 1001 is configured to send a product transfer request to the transaction server 1002, where the product transfer request includes a server identifier of the product server 1003 and product information of a product, and the product server 1003 is configured to provide the product and the product transfer request.

The transaction server 1002 is configured to authenticate the received product transfer request, and after the authentication succeeds, send the product information to the product server 1003 according to the server identifier.

The product server 1003 is configured to generate a product transfer instruction carrying the product information, and send the product transfer instruction to the transaction server 1002.

The transaction server 1002 is further configured to send the received product transfer instruction to the client device 1001.

The client device 1001 is further configured to receive the product transfer instruction, and if receiving a user confirmation that is triggered according to the product transfer instruction and used for performing transfer confirmation on the product corresponding to the product information, send the user confirmation to the transaction server 1002.

The transaction server 1002 is further configured to trigger, according to the user confirmation, the product server 1003 to transfer the product to the client device 1001.

Further, the client device 1001 may be the client device shown in FIG. 8 or 9, and the transaction server 1002 may be the transaction server shown in FIG. 5 or 6 or 7.

In accordance with some embodiments of transaction processing method 440, a transaction server (e.g., a WeChat server) authenticates a received product transfer request (e.g., a virtual toy purchase request), and sends product information to a product server (e.g., a merchant server) that is identified by a server identifier. The product server generates a product transfer instruction including the product information, and sends the product transfer instruction to a client device via the transaction server. The client device generates a user confirmation according to the product transfer instruction to confirm that the product transfer instruction is associated with a target product the user of the client device is interested in. The client device sends the user confirmation to the transaction server. The transaction server enables a fund transfer among the financial accounts of the user and the merchant according to the user confirmation, and sends a payment completion notice to the product server to authorize transferring the product to the client device.

In various embodiments of the application, the transaction server acts as an intermediate server between the client device and the product server. The transaction server has to authenticate the identity of the product server after it receives the product transfer request from the client device. In accordance with the authentication, the transaction server determines that the product server is a trustable server rather than a malicious server. Conversely, when the transaction server identifies a malicious product server, it terminates the interaction between the client device and the product server, and protects the client device from leaking any private information associated with the user account to the malicious server. As such, the transaction server acts as an intermediate server and improves the security level required by many secure transactions.

Some embodiments of the application further provide a secure transaction system. The secure transaction system includes: a client device 1001, a transaction server 1002, and a product server 1003. The client device 1001, the transaction server 1002, and the product server 1003 are connected by using a wired network or a wireless network.

The client device 1001 is configured to send a product transfer request to the transaction server 1002, where the product transfer request includes a server identifier of the product server 1003 and product information of a product, and the product server 1003 is configured to provide the product and the product transfer request.

The transaction server 1002 is configured to authenticate the received product transfer request, and after the authentication succeeds, send the product information to the product server 1003 according to the server identifier.

The product server 1003 is configured to generate a product transfer instruction carrying the product information, and send the product transfer instruction to the transaction server 1002.

The transaction server 1002 is further configured to send the received product transfer instruction to the client device 1001.

The client device 1001 is further configured to receive the product transfer instruction, and if receiving a user confirmation that is triggered according to the product transfer instruction and used for performing transfer confirmation on the product corresponding to the product information, send the user confirmation to the transaction server 1002.

The transaction server 1002 is further configured to trigger, according to the user confirmation, the product server 1003 to transfer the product to the client device 1001.

The product server 1003 is further configured to convert the product transfer request into display information for display, and provide the displayed information to the client device 1001, where the displayed information includes at least one of a two-dimensional bar code, text information, picture information, and picture-text information.

The client device 1001 is further configured to: when the displayed information provided by the product server 1003 is triggered, convert the displayed information into the product transfer request.

The transaction server 1002 is further configured to send a product transfer request generating rule to the product server 1003.

The product server 1003 is further configured to generate the product transfer request of the product according to the request generating rule.

In some embodiments, the client device 1001 is further configured to: if the displayed information is a two-dimensional bar code, scan the displayed information, and convert the displayed information into the product transfer request; or if the displayed information is text information or picture information or picture-text information, display the obtained display information, and when a selection signal indicating that the displayed information is selected is received, convert the displayed information into the product transfer request.

The transaction server 1002 is further configured to obtain a notification message indicating that the product server 1003 is successfully triggered to transfer the product to the client device 1001, and send the notification message to the product server 1003.

The product server 1003 is further configured to transfer the product to the client device 1001 according to the received notification message, and maintain an execution state of the product transfer instruction.

In some embodiments, the transaction server 1002 is further configured to determine, from at least one piece of prestored integrity key information, integrity key information corresponding to the server identifier; sign for all content of the product transfer request according to the determined integrity key information, to obtain signature information; detect whether the request signature is consistent with signature information included in the product transfer request, where the request integrity data included in the product transfer request is obtained by the product server 1003 by signing for all the content of the product transfer request according to the integrity key information sent by the transaction server 1002; and if a detecting result is that the request signature is consistent with the request integrity data included in the product transfer request, determine that the authentication on the product transfer request succeeds.

Further, the client device 1001 may be the client device shown in FIG. 8 or 9, and the transaction server 1002 may be the transaction server shown in FIG. 5 or 6 or 7.

In accordance with some embodiments of transaction processing method 440, a transaction server (e.g., a WeChat server) authenticates a received product transfer request (e.g., a virtual toy purchase request), and sends product information to a product server (e.g., a merchant server) that is identified by a server identifier. The product server generates a product transfer instruction including the product information, and sends the product transfer instruction to a client device via the transaction server. The client device generates a user confirmation according to the product transfer instruction to confirm that the product transfer instruction is associated with a target product the user of the client device is interested in. The client device sends the user confirmation to the transaction server. The transaction server enables a fund transfer among the financial accounts of the user and the merchant according to the user confirmation, and sends a payment completion notice to the product server to authorize transferring the product to the client device.

In various embodiments of the application, the transaction server acts as an intermediate server between the client device and the product server. The transaction server has to authenticate the identity of the product server after it receives the product transfer request from the client device. In accordance with the authentication, the transaction server determines that the product server is a trustable server rather than a malicious server. Conversely, when the transaction server identifies a malicious product server, it terminates the interaction between the client device and the product server, and protects the client device from leaking any private information associated with the user account to the malicious server. As such, the transaction server acts as an intermediate server and improves the security level required by many secure transactions.

In addition, a product transfer request provided by the product server is converted into information for display on the client device. The client device obtains the display information in the product transfer request. When the user selects a product according to the displayed information, the client device converts the displayed information into the product transfer request and sends the product transfer request to the transaction server. The information displayed to the client device is one of a two-dimensional bar code, text information, picture information, and picture-text information, and therefore, the client device could obtain the product transfer request in multiple ways.

Figure 11:
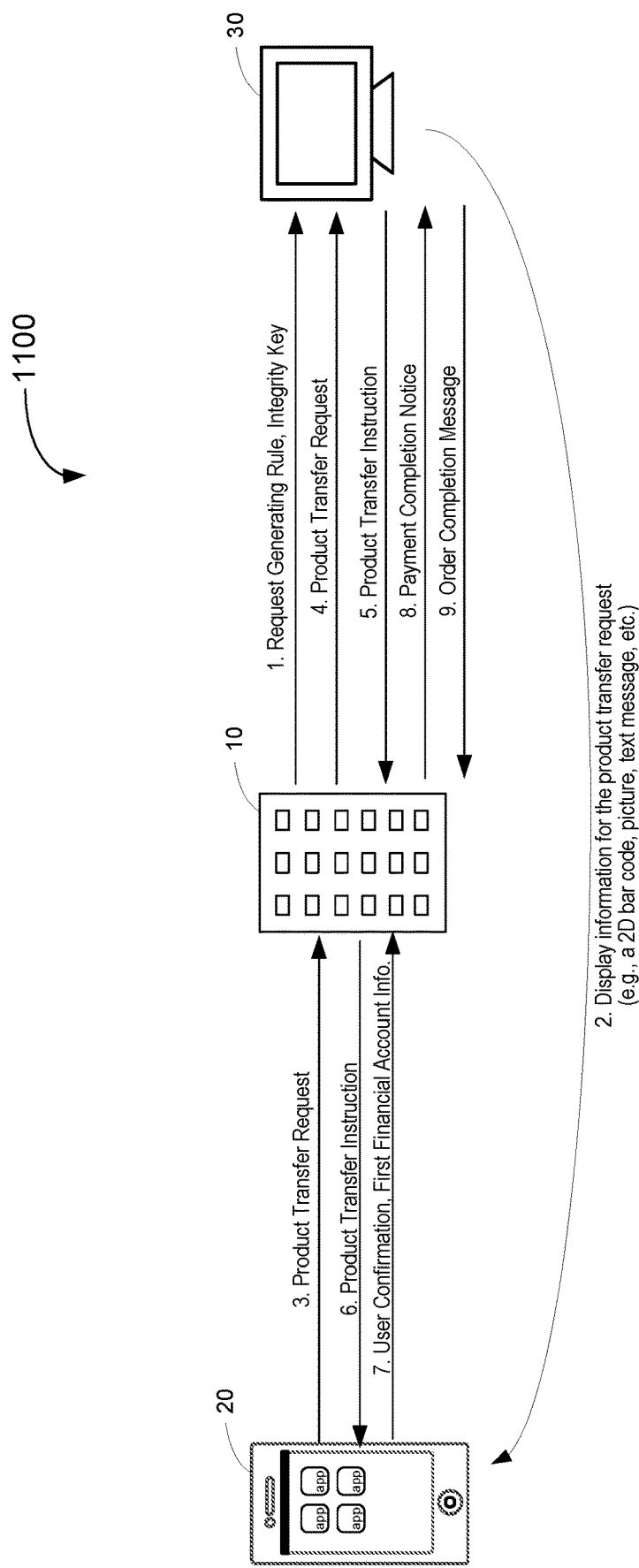
FIG. 11 is an exemplary secure transaction process in which information is exchanged among a server system, a client device and a product server in accordance with some embodiments.

FIG. 11 is an exemplary secure transaction process 1100 in which information is exchanged among a server system 10, a client device 20 and a product server 30 in accordance with some embodiments. Specifically, the transaction server 10 functions as an intermediary between client device 20 and product server 30. The transaction server 10 controls secure information associated with the user account or the client device (e.g., financial account information), and protects such secure information from being leaked to the product server. In some implementations, the transaction server 10 is a server that enables a social network application (e.g., WeChat, Facebook, WhatsApp and the like). Client device 20 is installed with the social network application, and when a user logs onto a user account on the social network application, he or she could initiate a secure transaction with product server 30. In this secure transaction, transaction server 10 functions as an intermediary to ensure the security of the sensitive user information.

In some embodiments, prior to a secure transaction, transaction server 10 generates a request generating rule and an integrity key for each product server 30. Transaction server 10 maintains a server information database that stores information associated with a plurality of product servers. In the server information database, transaction server identifies of product servers are associated with their corresponding request generating rules and integrity keys.

Product server 30 then generates display information associated with its products, and the display information associated with each product includes a product transfer request. Exemplary display information includes a 2D bar code (e.g., a QR code), a picture and a text message. When client device 20 receives the display information, a user could choose to purchase the product associated with the display information. The product transfer request is obtained from the display information, and sent to transaction server 10. In some embodiments, the product transfer request includes request integrity data, and transaction server 10 authenticates the product transfer request by generating a request signature using the integrity key in its server information database and determining whether the request signature is consistent with the received request integrity data.

After transaction server 10 authenticates the product transfer request, it forwards the product transfer request to product server 40. Upon receiving the product transfer request, product server 30 acknowledges that the user associated with the user account of the social network platform intends to purchase the product, and sends a product transfer instruction to client device 20 via transaction server 10. In some embodiments, the product transfer instruction includes instruction integrity data. Transaction server 10 authenticates the product transfer instruction by generating an instruction signature using the integrity key in its server information database and determining whether the instruction signature is consistent with the received instruction integrity data. Transaction server 10 forwards the product transfer instruction only when it authenticates the instruction.

Upon receiving the product transfer instruction, the user of client device 20 confirms the purchase order, and provides information of a first financial account. A user confirmation is sent from client device 20 to transaction server 10 in conjunction with first financial account information. Transaction server 10 transfers a payment amount from this first financial account to a second financial account owned by the merchant who provides the product. In some embodiments, information of the second financial account has been stored in the server information database in association with the server identifier of the product server. When the payment is successfully made, transaction server 10 generates a payment completion notice and sends it to product server 30.

When product server 30 receives the payment completion notice, it transfers the product to the user or the user account. The product is optionally a physical product or a virtual product. More details on the product are explained above with reference to FIG. 1. When the product has been provided to the user, product server 30 returns an order completion message to transaction server 10 to notify transaction server 10 that the purchase order has been successfully completed.

In various embodiment of the present application, communications between server 10 and client device 20 or between server 10 and product server 30 are enabled by one or more communication networks. The communication networks can be one or more networks having one or more type of topologies, including but not limited to the Internet, intranets, local area networks (LANs), cellular networks, Ethernet, Storage Area Networks (SANs), telephone networks, Bluetooth personal area networks (PAN) and the like.

FIG. 12 is a flow chart of an exemplary method 1200 for implementing a secure transaction (e.g., a purchase order) in accordance with some embodiments. Method 1200 is implemented on a transaction server for implementing a secure transaction via a social network platform. Specifically, the transaction server is a server that enables the social network platform for a client device. Examples of the social network platform include, but are not limited to, WeChat, WhatsApp, Facebook, Google+ and the like.

The transaction server receives (1202) a product purchase request from a client device, and the product purchase request includes product information, product server information and a user account identifier of the social network platform. The transaction server authenticates (1204) the product purchase request, and forwards (1206) the product purchase request of the corresponding product to the product server in an encrypted format.

After receiving a confirmation message from the product server, the transaction server initiates (1208) a payment transaction between the user account and the product server, and after completing the payment transaction, sends (1210) a payment completion message to the client device and the product server, respectively.

In some embodiments, when a user of the client device intends to purchase the product, the client device is configured to obtain the product transfer request by scanning a QR code or clicking on a product link, and the QR code and the product link are provided by the product server. Further, in some embodiments, the QR code and the product link provided by the product server are generated according to a request generating rule that is assigned by the transaction server to the product server, and authorized by the transaction server for display on the social network platform.

In some embodiments, initiating the payment transaction between the user account and the product server includes: receiving, from the client device, a user confirmation of the product purchase request and information of a first financial account; and making a financial transfer from the first financial account to a second financial account associated with the product server based on a price of the corresponding product.

In some embodiments, the transaction server includes a server information database that includes information concerning a plurality of product servers, and each product server is associated with a respective request generating rule and a respective integrity key. In some embodiments, the transaction server stores information of a financial account associated with the product server.

In some embodiments, the product purchase request includes request integrity data that are generated in the product server by combining at least part of the product purchase request with an integrity key uniquely associated with the product server. Further, in some embodiments, the transaction server authenticates the product purchase request by generating another request signature based on the integrity key and the received product transfer request and comparing the request signature with the request integrity data received in the product transfer request.

In some embodiments, the product information includes a product identifier, a product name, a quantity, description and a price of the corresponding product.

In some embodiments, the product server is configured to enable the transfer of the product to the user upon receiving the payment completion message.

In some embodiments, the product includes data and programs, and the product server provides the data and program product to the client device directly from the product server. Further, in some embodiments, the product is selected from Stickers or Emotions on the social network platform, virtual equipment in a game application, and an online member service.

It is noted that, when the transaction processing system and secure transaction system provided by the foregoing embodiments process a request, the foregoing function module division is merely used as an example for description. In practical application, the foregoing functions may be allocated to be implemented by different function modules as required, that is, the internal structures of the transaction processing system and the secure transaction system are divided into different function modules, so as to implement all or a part of the functions described above. In addition, the transaction processing system and secure transaction system provided by the foregoing embodiments belong to the same conception as the transaction processing method. For specific implementation processes, refer to the method embodiments. Details are not described herein again.

Numbers of the embodiments of the application are merely intended for description, and do not represent superiority and inferiority of the embodiments.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

What is claimed is:

1. A method for implementing a secure transaction via a social network platform, comprising:
    executing by a first server, an instant messaging application hosting the social network platform, including displaying on a client device a user interface corresponding to a chat session of the instant messaging application;
    sending, by the first server, a request generating rule and integrity key information to a virtual product server;
    generating, by the virtual product server, display information using the generating rule and the integrity key information, wherein the display information consists of a QR code or product link;
    scanning, by the client device, the QR code or receiving, by the client device, an input for the product link;
    obtaining, by the client device, a product purchase request based on the scanning of the QR code or the receiving the input for the product link;
    receiving, via the instant messaging application, the product purchase request from the client device, the product purchase request configured to request transaction of a sticker or emotion item from the virtual product server and including product information, product server information and a user account identifier of the social network platform, wherein the virtual product server is distinct from the first server and the client device;
    authenticating by the first server the product purchase request for the sticker or emotion item according to the integrity key corresponding to the virtual product server;
    forwarding by the first server the product purchase request of the corresponding sticker or emotion item to the virtual product server in an encrypted format;
    receiving by the first server a confirmation message from the virtual product server, the confirmation message including a product purchase instruction of the corresponding sticker or emotion item generated by the virtual product server according to the integrity key;
    after receiving the confirmation message from the virtual product server, initiating by the first server a payment transaction between the user account identifier and a user account of the virtual product server at the social network platform, further including:
        sending, to the client device, the product purchase instruction of the corresponding sticker or emotion item;
        receiving, from the client device, a user confirmation of the product purchase instruction and information of a first financial account entered by a user of the client device;
        obtaining a second financial account associated with the user account of the virtual product server; and
        making a financial transfer from the first financial account to the second financial account associated with the virtual product server based on a price of the corresponding sticker or emotion item in the product purchase instruction; and
    after completing the payment transaction,
        sending, by the first server, a payment completion message to the client device and the virtual product server, respectively,
        obtaining, by the client device, information of the sticker or emotion item from the virtual product server, and
        displaying the sticker or emotion item within a text message on the user interface that corresponds to the chat session of the instant messaging application on the client device.

2. The method of claim 1, wherein the QR code and the product link provided by the virtual product server are generated according to a request generating rule that is assigned by the first server to the virtual product server, and authorized by the first server for display on the social network platform.

3. The method of claim 1, wherein the first server includes a server information database that includes information concerning a plurality of virtual product servers, and each virtual product server is associated with a respective request generating rule and a respective integrity key.

4. The method of claim 1, wherein the first server stores information of a financial account associated with the virtual product server.

5. The method of claim 1, wherein the product purchase request includes request integrity data that are generated in the virtual product server by combining at least part of the product purchase request with an integrity key uniquely associated with the virtual product server.

6. The method of claim 5, wherein the first server authenticates the product purchase request by generating a request signature based on the integrity key and the received product purchase request and comparing the request signature with the request integrity data received in the product purchase request.

7. The method of claim 1, wherein the product information includes a product identifier, a product name, a quantity, description and a price of the corresponding sticker or emotion item.

8. The method of claim 1, wherein the virtual product server is configured to enable a transfer of the sticker or emotion item to the client device upon receiving the payment completion message.

9. The method of claim 1, wherein the sticker or emotion item includes data and programs, and the virtual product server provides the data and programs to the client device directly from the virtual product server.

10. A computer system including a first server, a client device and a virtual product server that implements a secure transaction via a social network platform, comprising:
one or more processors; and
memory having instructions stored thereon, which when executed by the one or more processors cause the processors to perform operations, comprising:
executing by the first server an instant messaging application hosting the social network platform, including displaying on the client device a user interface corresponding to a chat session of the instant messaging application;
sending, by the first server, a request generating rule and integrity key information to a virtual product server;
generating, by the virtual product server, display information using the generating rule and the integrity key information, wherein the display information consists of a QR code or product link;
scanning, by the client device, the QR code or receiving, by the client device, an input for the product link;
obtaining, by the client device, a product purchase request based on the scanning of the QR code or the receiving the input for the product link;
receiving, via the instant messaging application, the product purchase request from the client device, the product purchase request configured to request transaction of a sticker or emotion item from the virtual product server and including product information, product server information and a user account identifier of the social network platform, wherein the virtual product server is distinct from the first server and the client device;
authenticating by the first server the product purchase request for the sticker or emotion item according to the integrity key corresponding to the virtual product server;
forwarding by the first server the product purchase request of the corresponding sticker or emotion item to the virtual product server in an encrypted format;
receiving by the first server a confirmation message from the virtual product server, the confirmation message including a product purchase instruction of the corresponding sticker or emotion item generated by the virtual product server according to the integrity key;
after receiving the confirmation message from the virtual product server, initiating by the first server a payment transaction between the user account identifier and a user account of the virtual product server at the social network platform, further including:
sending, to the client device, the product purchase instruction of the corresponding sticker or emotion item;
receiving, from the client device, a user confirmation of the product purchase instruction and information of a first financial account entered by a user of the client device;
obtaining a second financial account associated with the user account of the virtual product server; and
making a financial transfer from the first financial account to the second financial account associated with the virtual product server based on a price of the corresponding sticker or emotion item in the product purchase instruction; and
after completing the payment transaction,
sending, by the first server, a payment completion message to the client device and the virtual product server, respectively,
obtaining, by the client device, information of the sticker or emotion item from the virtual product server, and
displaying the sticker or emotion item within a text message on the user interface that corresponds to the chat session of the instant messaging application on the client device.

11. The computer system of claim 10, wherein the computer system includes a server information database that includes information concerning a plurality of virtual product servers, and each virtual product server is associated with a respective request generating rule and a respective integrity key.

12. A non-transitory computer-readable medium, having instructions stored thereon, which when executed by a computer system including a first server, a client device and a virtual product server, each having one or more processors cause the computer system to perform operations comprising:
executing by the first server an instant messaging application hosting a social network platform, including displaying on the client device a user interface corresponding to a chat session of the instant messaging application;
sending, by the first server, a request generating rule and integrity key information to a virtual product server;
generating, by the virtual product server, display information using the generating rule and the integrity key information, wherein the display information consists of a QR code or product link;
scanning, by the client device, the QR code or receiving, by the client device, an input for the product link;
obtaining, by the client device, a product purchase request based on the scanning of the QR code or the receiving the input for the product link;
receiving, via the instant messaging application, the product purchase request from the client device, the product purchase request configured to request transaction of a sticker or emotion item from the virtual product server and including product information, product server information and a user account identifier of the social network platform, wherein the virtual product server is distinct from the first server and the client device;
authenticating by the first server the product purchase request for the sticker or emotion item according to the integrity key corresponding to the virtual product server;
forwarding by the first server the product purchase request of the corresponding sticker or emotion item to the virtual product server in an encrypted format;
receiving by the first server a confirmation message from the virtual product server, the confirmation message including a product purchase instruction of the corresponding sticker or emotion item generated by the virtual product server according to the integrity key;
after receiving the confirmation message from the virtual product server, initiating by the first server a payment transaction between the user account identifier and a user account of the virtual product server at the social network platform, further including:

sending, to the client device, the product purchase instruction of the corresponding sticker or emotion item;

receiving, from the client device, a user confirmation of the product purchase instruction and information of a first financial account entered by a user of the client device;

obtaining a second financial account associated with the user account of the virtual product server; and making a financial transfer from the first financial account to the second financial account associated with the virtual product server based on a price of the corresponding sticker or emotion item in the product purchase instruction; and after completing the payment transaction, sending, by the first server, a payment completion message to the client device and the virtual product server, respectively, obtaining, by the client device, information of the sticker or emotion item from the virtual product server, and displaying the sticker or emotion item within a text message on the user interface that corresponds to the chat session of the instant messaging application on the client device.

13. The non-transitory computer-readable medium of claim 12, wherein the product purchase request includes request integrity data that are generated in the virtual product server by combining at least part of the product purchase request with an integrity key uniquely associated with the virtual product server, and the first server authenticates the product purchase request by generating a request signature based on the integrity key and the received product purchase request and comparing the request signature with the request integrity data received in the product purchase request.

14. The non-transitory computer-readable medium of claim 12, wherein the product information includes a product identifier, a product name, a quantity, description and a price of the corresponding sticker or emotion item.

15. The non-transitory computer-readable medium of claim 12, wherein the sticker or emotion item includes data and programs, and the virtual product server provides the data and programs to the client device directly from the virtual product server.

* * * * *